United States Patent
Tischer et al.

(10) Patent No.: US 7,623,654 B2
(45) Date of Patent: *Nov. 24, 2009

(54) SYSTEMS AND METHODS FOR INTERFACING TELEPHONY DEVICES WITH CELLULAR AND COMPUTER NETWORKS

(75) Inventors: Steven Tischer, Atlanta, GA (US); Kevin Kleinfelter, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 738 days.

This patent is subject to a terminal disclaimer.

(21) Appl. No.: 10/929,715

(22) Filed: Aug. 30, 2004

(65) Prior Publication Data

US 2005/0032435 A1    Feb. 10, 2005

Related U.S. Application Data

(63) Continuation-in-part of application No. 10/195,197, filed on Jul. 15, 2002, now Pat. No. 7,194,083.

(51) Int. Cl.
*H04M 1/00* (2006.01)
*H04M 9/00* (2006.01)

(52) U.S. Cl. .................. 379/413.03; 379/219
(58) Field of Classification Search ............... 379/219, 379/413.03
See application file for complete search history.

(56) References Cited

U.S. PATENT DOCUMENTS

| | | | |
|---|---|---|---|
| 4,866,762 A | 9/1989 | Pintar | 379/200 |
| 5,774,793 A * | 6/1998 | Cooper et al. | 455/418 |
| 5,905,950 A | 5/1999 | Anell | 455/421 |
| 6,526,581 B1 * | 2/2003 | Edson | 725/74 |
| 6,600,734 B1 * | 7/2003 | Gernert et al. | 370/352 |
| 6,704,580 B1 * | 3/2004 | Fintel | 455/550.1 |
| 6,778,824 B2 * | 8/2004 | Wonak et al. | 455/426.2 |
| 2004/0132438 A1 | 7/2004 | White | 455/418 |
| 2004/0240647 A1 | 12/2004 | Tiliks et al. | 379/114.14 |

OTHER PUBLICATIONS

U.S. Official Action dated Jul. 6, 2007 in U.S. Appl. No. 11/637,264.

* cited by examiner

*Primary Examiner*—Alexander Jamal
(74) *Attorney, Agent, or Firm*—Moazzam & Associates, LLC

(57) ABSTRACT

Systems and methods for interfacing plain old telephone system (POTS) devices, cellular network devices, and computer network devices with computer networks and cellular networks is presented. In a broad sense, the system includes an interface that bridges the POTS devices and the cellular devices with computer networks. The interface also bridges computer network devices with the cellular network. The interface is configured to convert signals which are compatible with POTS networks and cellular networks into signals compatible with computer networks. The signals may include content signals representing a telephone call and call attribute signals used to establish a telephone call. The interface is further configured to convert computer network compatible signals into cellular network compatible signals. The interface may also be utilized to aggregate cellular and computer network signals for communicating segmented data over multiple networks.

24 Claims, 20 Drawing Sheets

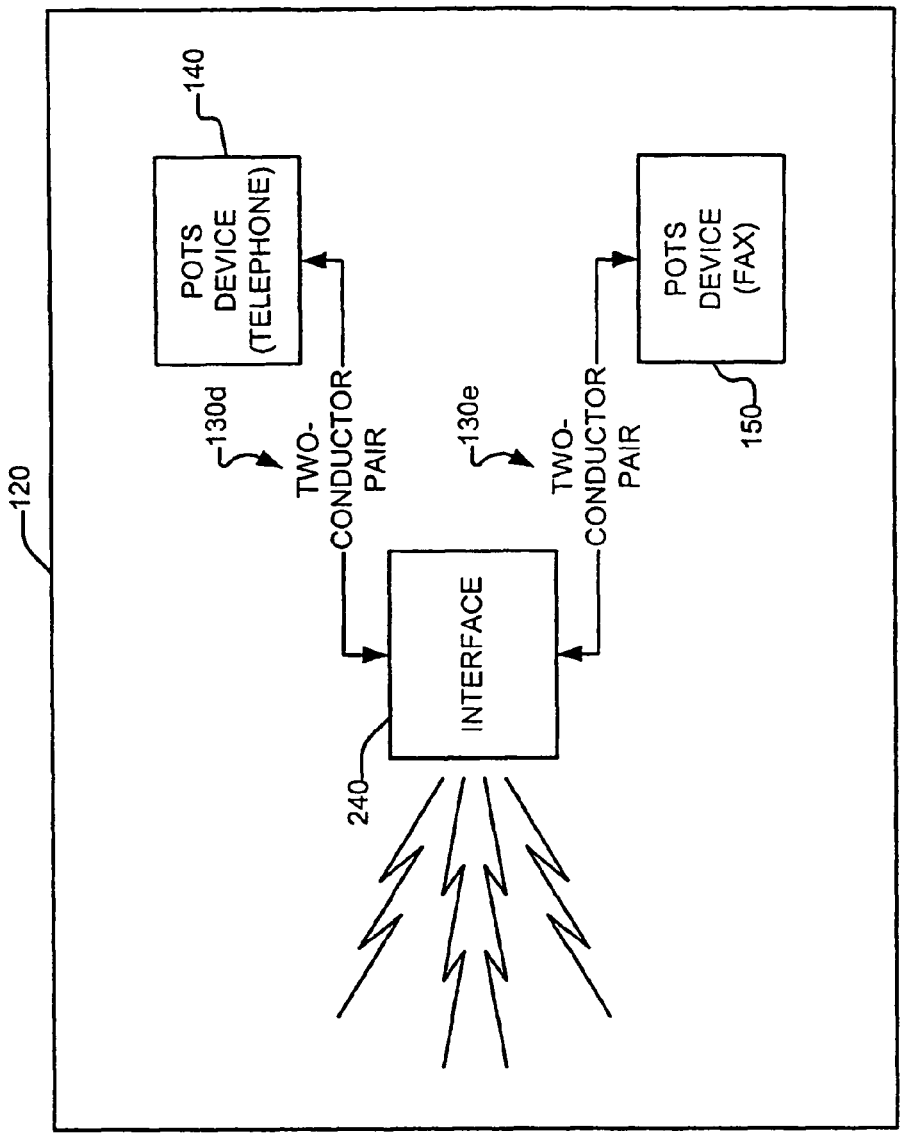
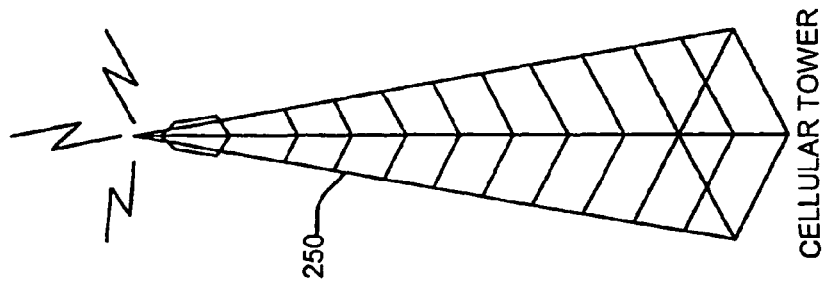
FIG. 2

SYSTEMS AND METHODS FOR INTERFACING TELEPHONY DEVICES WITH CELLULAR AND COMPUTER NETWORKS

CROSS REFERENCE TO RELATED APPLICATIONS

This patent application is a continuation-in-part of U.S. patent application Ser. No. 10/195,197, entitled "System and Method for Interfacing Plain Old Telephone System (POTS) Devices With Cellular Networks," filed on Jul. 15, 2002 now U.S. Pat. No. 7,194,083 and assigned to the same assignee as this application.

FIELD OF INVENTION

The present invention relates generally to telecommunications and, more particularly, to systems and methods for interfacing plain old telephone system (POTS) devices, cellular telephone devices, and computer telephony devices with cellular networks and computer networks.

BACKGROUND

The telephone has greatly facilitated communications between parties, especially when great distances separate the parties. Metropolitan cities and suburbs typically have sufficient access to a public switched telecommunications/telephone network (PSTN), as well as cellular networks. In addition, emerging computer network protocols and solutions, such as voice-over-IP (VoIP), allow parties to use computers to communicate with each other over wide area networks, such as the Internet, in the same manner in which they currently communicate over PSTN and cellular networks. However, in most instances, owners of legacy devices such as cellular telephones and plain old telephone system (POTS) devices which are compatible with PSTN and cellular networks, do not have the ability to interface these devices with computer networks supporting the aforementioned emerging voice-over-computer protocols and solutions. Thus, legacy device owners are inconvenienced by having multiple telephones operating under separate systems. Moreover, there is currently no method for a sending party with access to PSTN, cellular, and computer networks to utilize these networks to combine large quantities of stored data for rapid communication to a receiving party.

SUMMARY

Systems and methods are provided for interfacing plain old telephone system (POTS) devices with cellular networks.

Briefly described, in architecture, one illustrative embodiment, among others, of the system comprises an interface configured to convert a POTS compatible signal or a cellular compatible signal to a computer network compatible signal, such as a Voice-over-Internet Protocol (VoIP) signal. The interface is further configured to convert a computer network compatible signal to a cellular network compatible signal. In addition to the interface, the illustrative embodiment comprises device connectors configured to couple a POTS device and computer network devices to the interface.

Another illustrative embodiment, among others, may be seen as a method for interfacing POTS devices cellular network devices, and computer network devices with a variety of communications networks. In this regard, one illustrative embodiment of the method may be seen as comprising the steps of converting a signal compatible with a first communications network to a signal compatible with a second communications network and converting the second network signal to the first network signal.

Still another illustrative embodiment, among others, may be seen as a method for aggregating two or more network connections for communicating data. In this regard, one illustrative embodiment of the method may be seen as comprising the steps of providing a network interface comprising network connections for communicating data over multiple networks, retrieving data from a data storage device in communication with the network interface, segmenting the retrieved data for transmission over the network connections, and utilizing the combined throughput of the network connections to simultaneously transmit the segmented data over the multiple networks.

Other systems, methods, features, and advantages will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram showing one illustrative embodiment of the system for interfacing POTS devices with cellular networks.

DETAILED DESCRIPTION OF THE ILLUSTRATIVE EMBODIMENTS

Reference will now be made in detail to the description. While several illustrative embodiments of the invention will be described in connection with these drawings, there is no intent to limit it to the illustrative embodiment or illustrative embodiments disclosed therein. On the contrary, the intent is to cover all alternatives, modifications, and equivalents included within the spirit and scope of the invention as defined by the claims.

Figure 1:
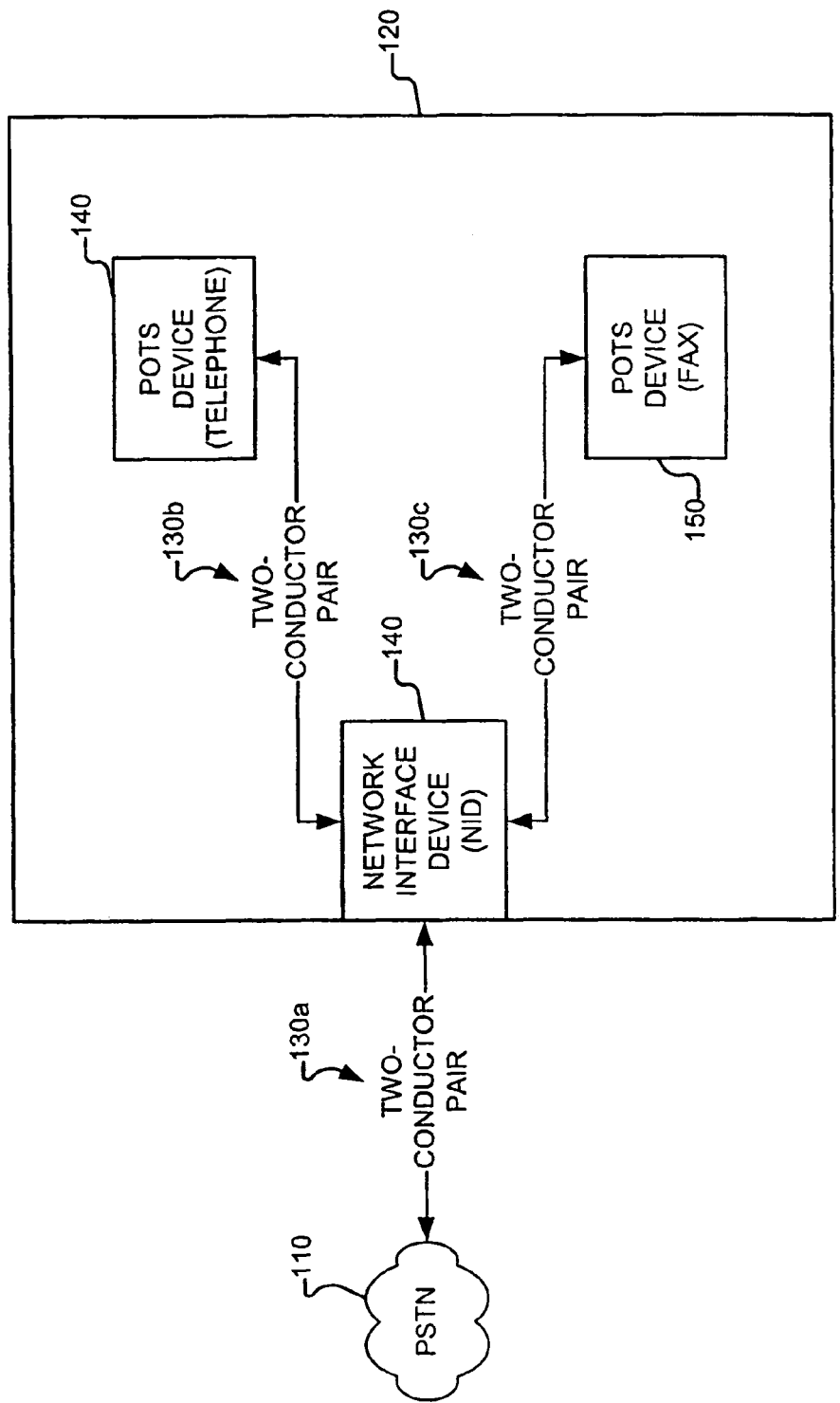
FIG. 1 is a block diagram showing a conventional plain old telephone system (POTS) connection to a telephone company through a network interface device.

FIG. 1 is a block diagram showing a conventional plain old telephone system (POTS) connection to a public switched telephone network (PSTN) 110 through a network interface device (NID) 140. Since such connections are well known, only a cursory discussion is presented here. As shown in FIG. 1, several POTS devices 140, 150 occupy a location 120 (e.g., home, business, etc.). Each POTS device 140, 150 is connected to the NID 140 by two-conductor pair wires 130b, 130c, also known as POTS pairs, or twisted pairs. The NID 140 serves as the interface between the POTS devices 140, 150 and the PSTN 110, wherein the ND 140 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface 240, thereby permitting connection between the POTS devices 140, 150 and a cellular network. In this sense, the POTS devices 140, 150 are connected to the interface 240, rather than an NID 140 (FIG. 1), by two-conductor pair wires 130d, 130e. Since the interface 240 is a bridge between the POTS devices 140, 150 and the cellular network, the interface 240 is configured to receive POTS compatible signals from the POTS devices 140, 150 and convert the POTS compatible signals to cellular network compatible signals, which are transmitted from the interface 240 to the cellular tower 250. Additionally, the interface 240 is configured to receive cellular network compatible signals from the cellular tower 250 and convert the cellular network compatible signals to POTS compatible signals, which are then forwarded to the POTS devices 140, 150 for use within the location 120. While a specific PSTN network is now shown in FIG. 2, it will be clear to one of ordinary skill in the art that the cellular tower 250 may be connected to a PSTN network, thereby permitting communication with other PSTN devices.

Figure 3:
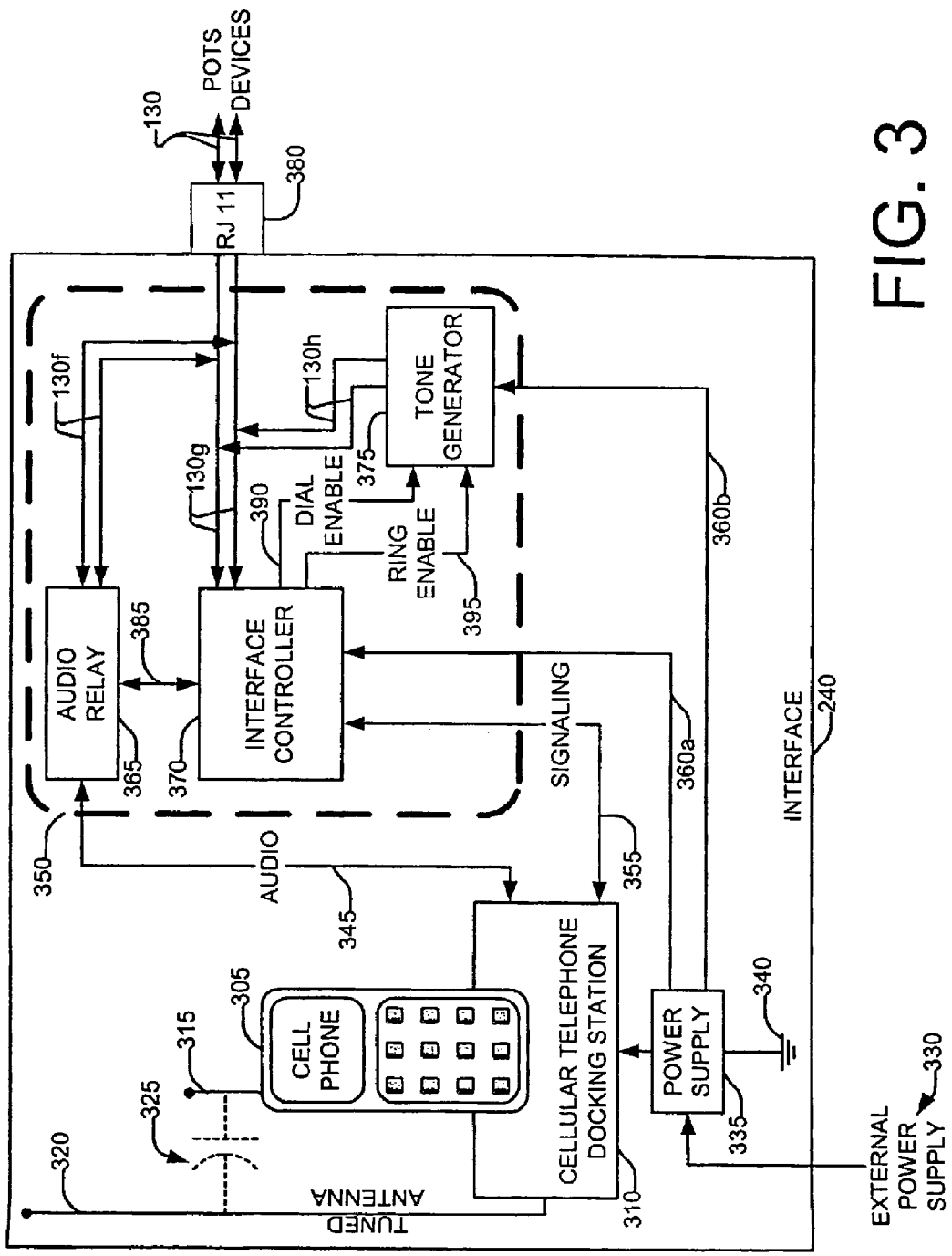
FIG. 3 is a block diagram showing one illustrative embodiment of the interface of FIG. 2.

FIG. 3 is a block diagram showing, in greater detail, a preferred illustrative embodiment of the interface 240 of FIG. 2. In the preferred illustrative embodiment, the cellular network compatible signals are transmitted and received at the interface 240 by a cellular telephone 305 while the POTS compatible signals are transmitted and received at the interface 240 through a POTS connector 380, such as an RJ11 connector 380. Thus, in the preferred illustrative embodiment, the interface 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number. The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 305 may modify the signaling data on signaling line 355 appropriately (e.g., amplify, attenuate, reformat, etc.), or, alternatively, the cellular phone docking station 305 may relay the signaling data on signaling line 355 without modification. Regardless of whether or not the signaling data on signaling line 355 is modified, several aspects of the conveyed signal are discussed below, in greater detail, with reference to other components 350 associated with the interface 240.

In addition to the cellular phone docking station 310, the interface 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
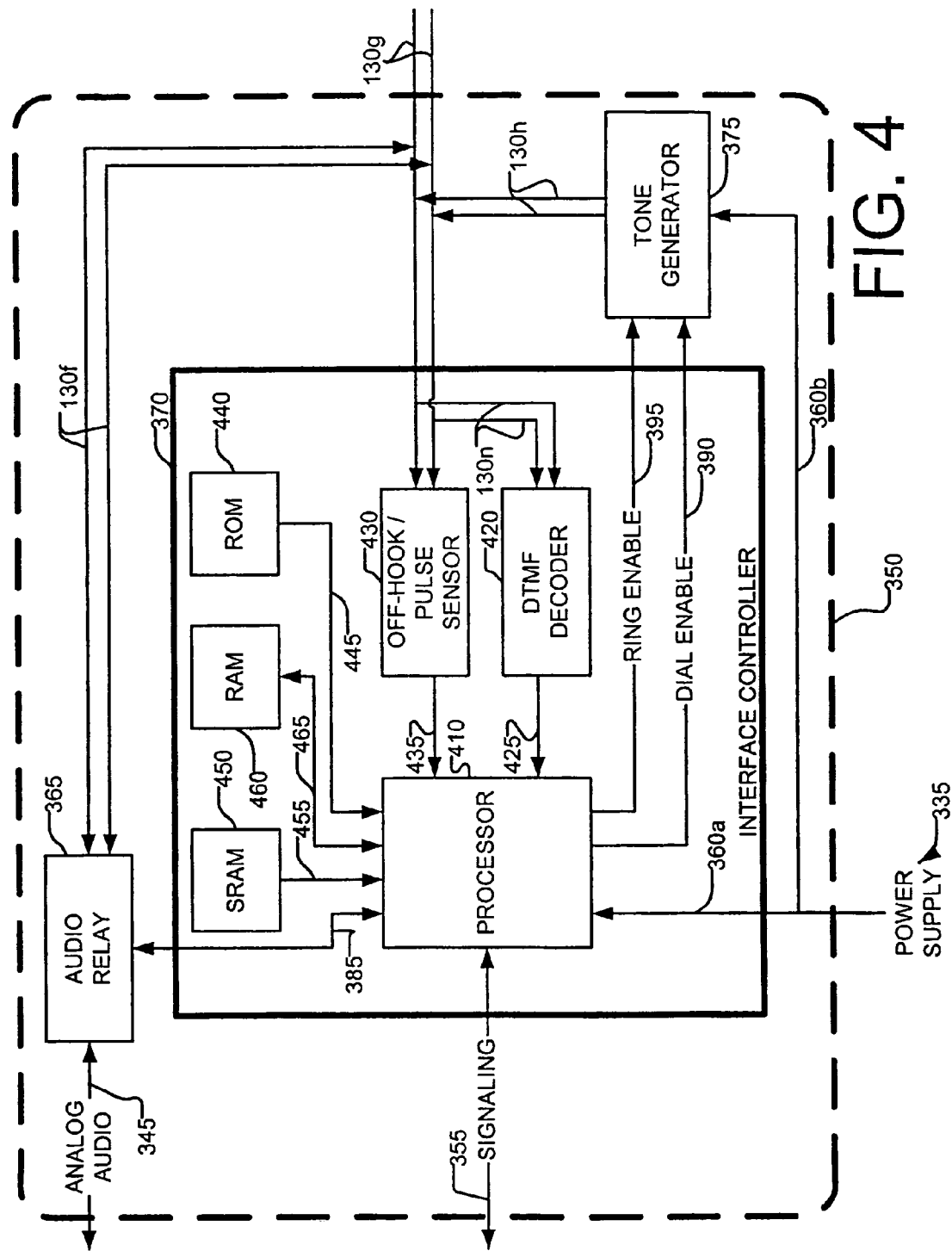
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, static-random-access memory (SRAM) 450, an off-hook/pulse sensor 430, and a dual-tone multi-frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

Figure 5:
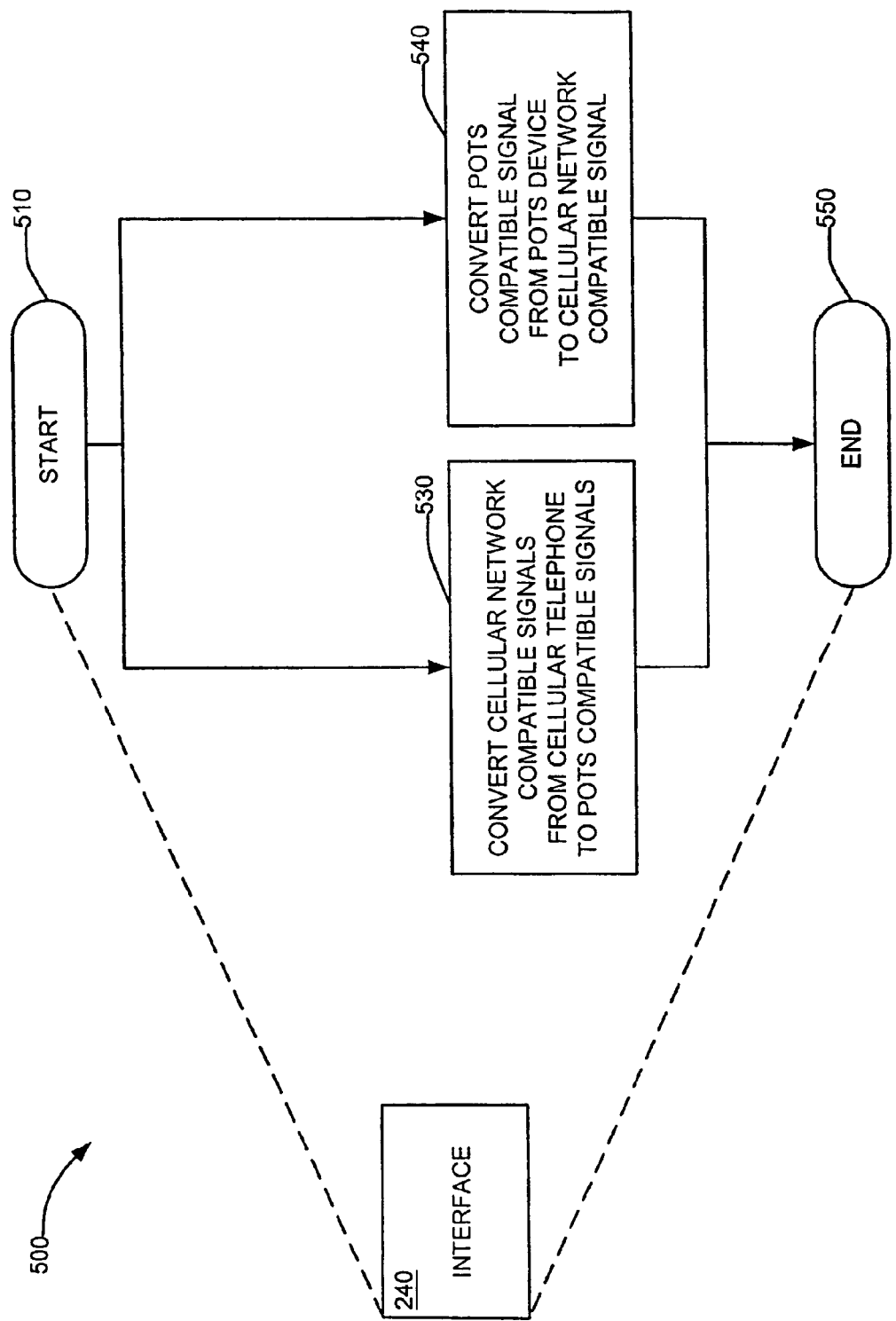
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface 240.

Figure 6A:
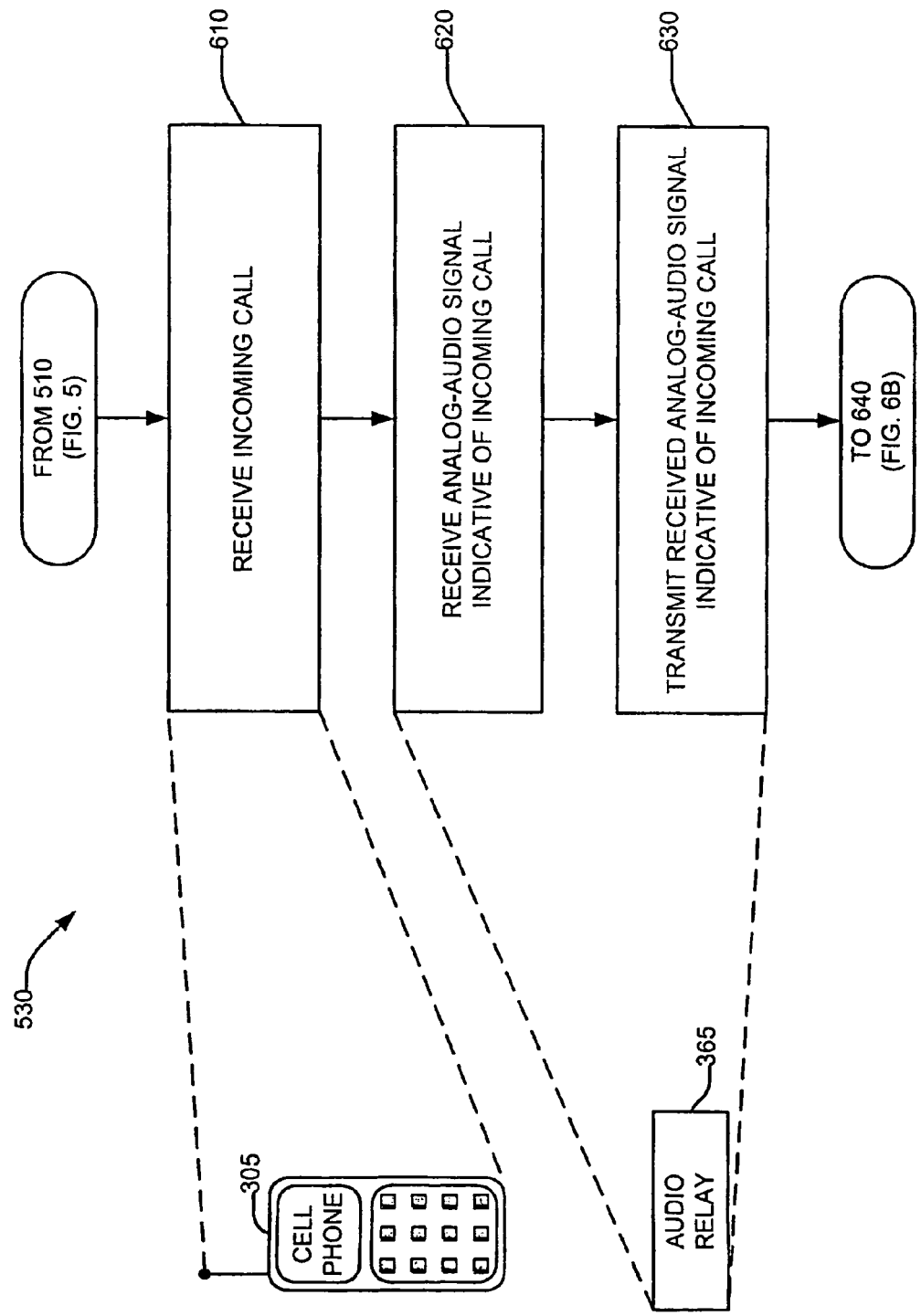
FIGS. 6A and 6B are flowcharts showing one illustrative embodiment of the method associated with the conversion of cellular network compatible signals to POTS compatible signals.
Figure 6B:
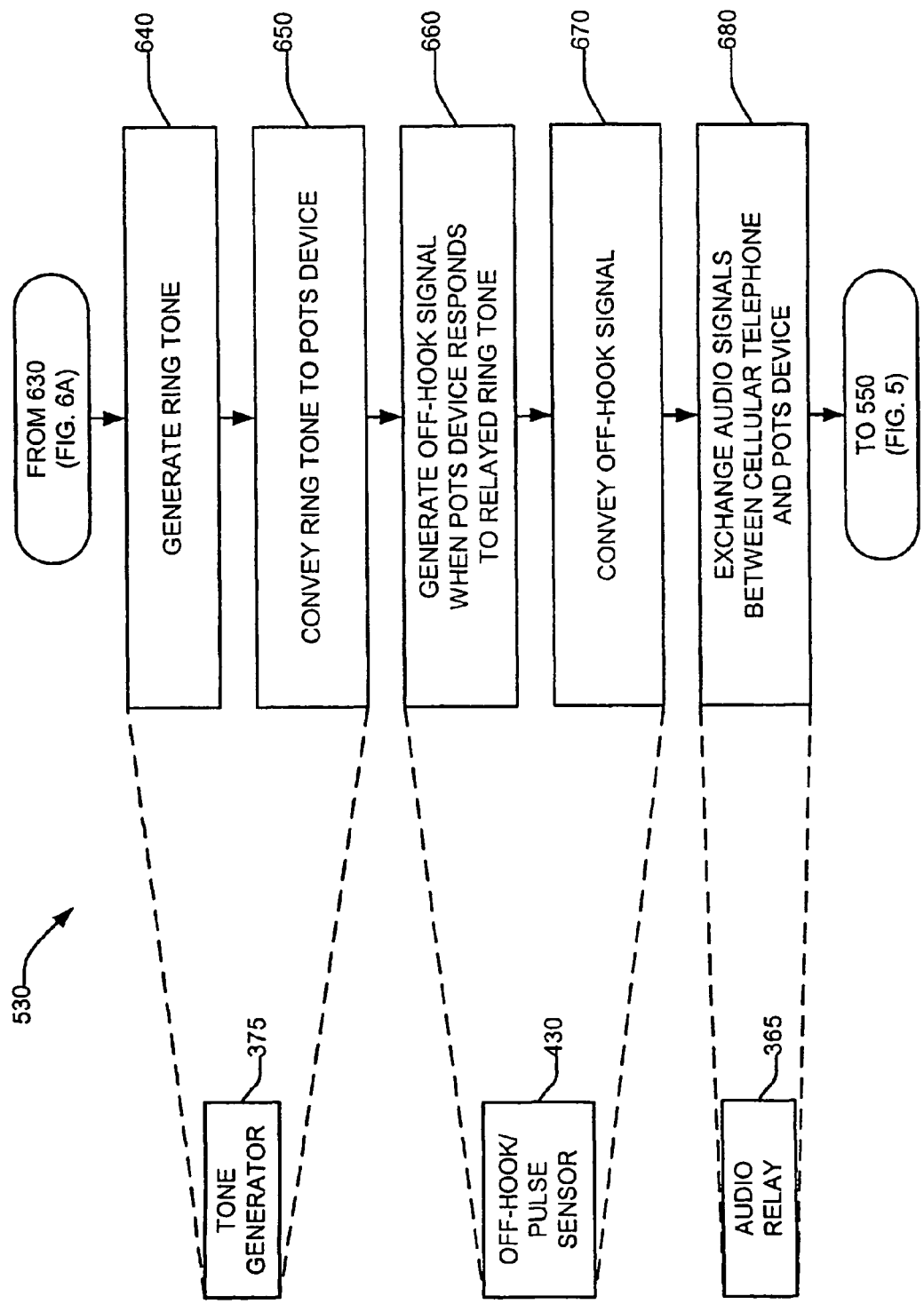

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
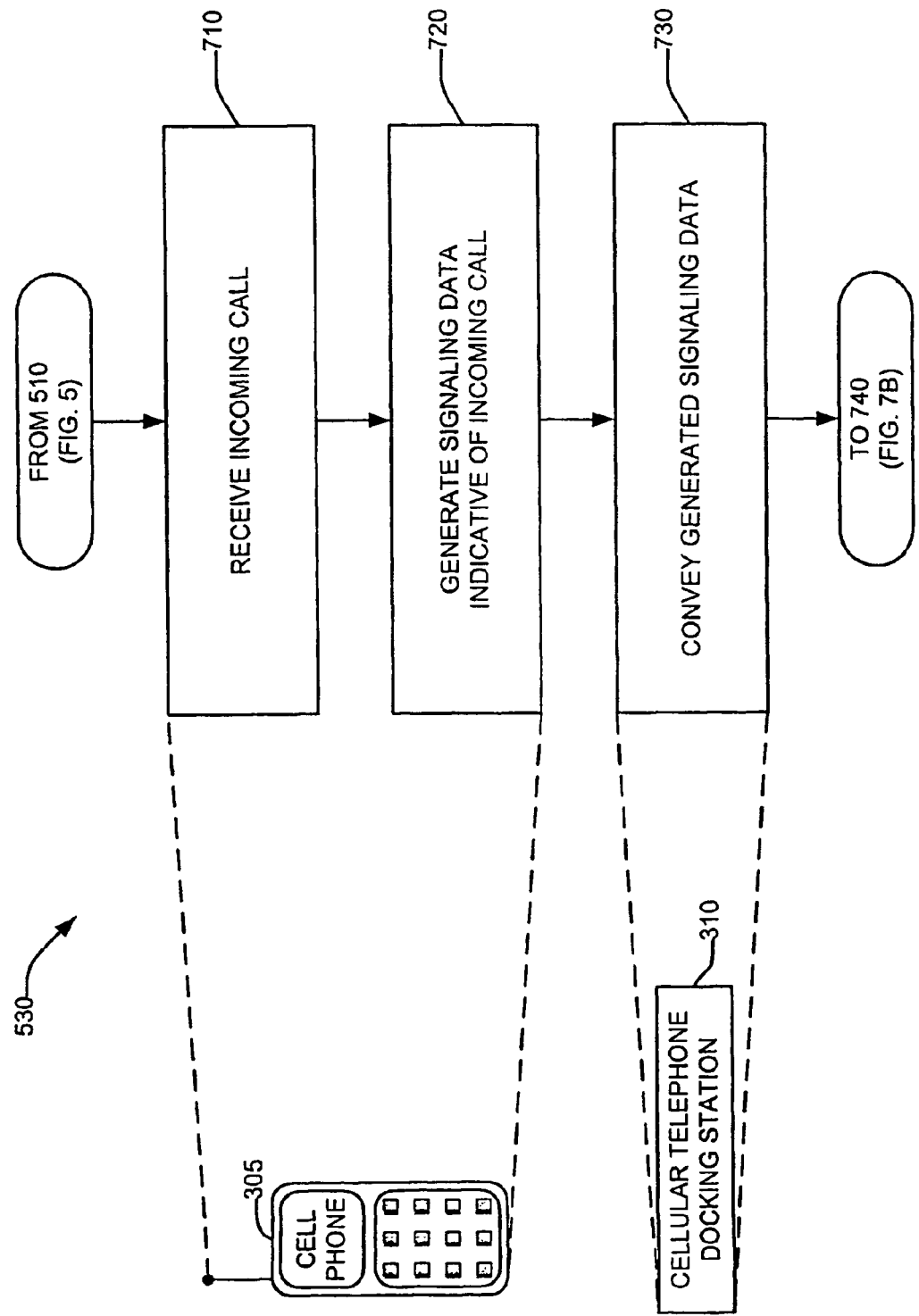
FIGS. 7A and 7B are flowcharts showing another illustrative embodiment of the method associated with the conversion of cellular network compatible signals to POTS compatible signals.
Figure 7B:
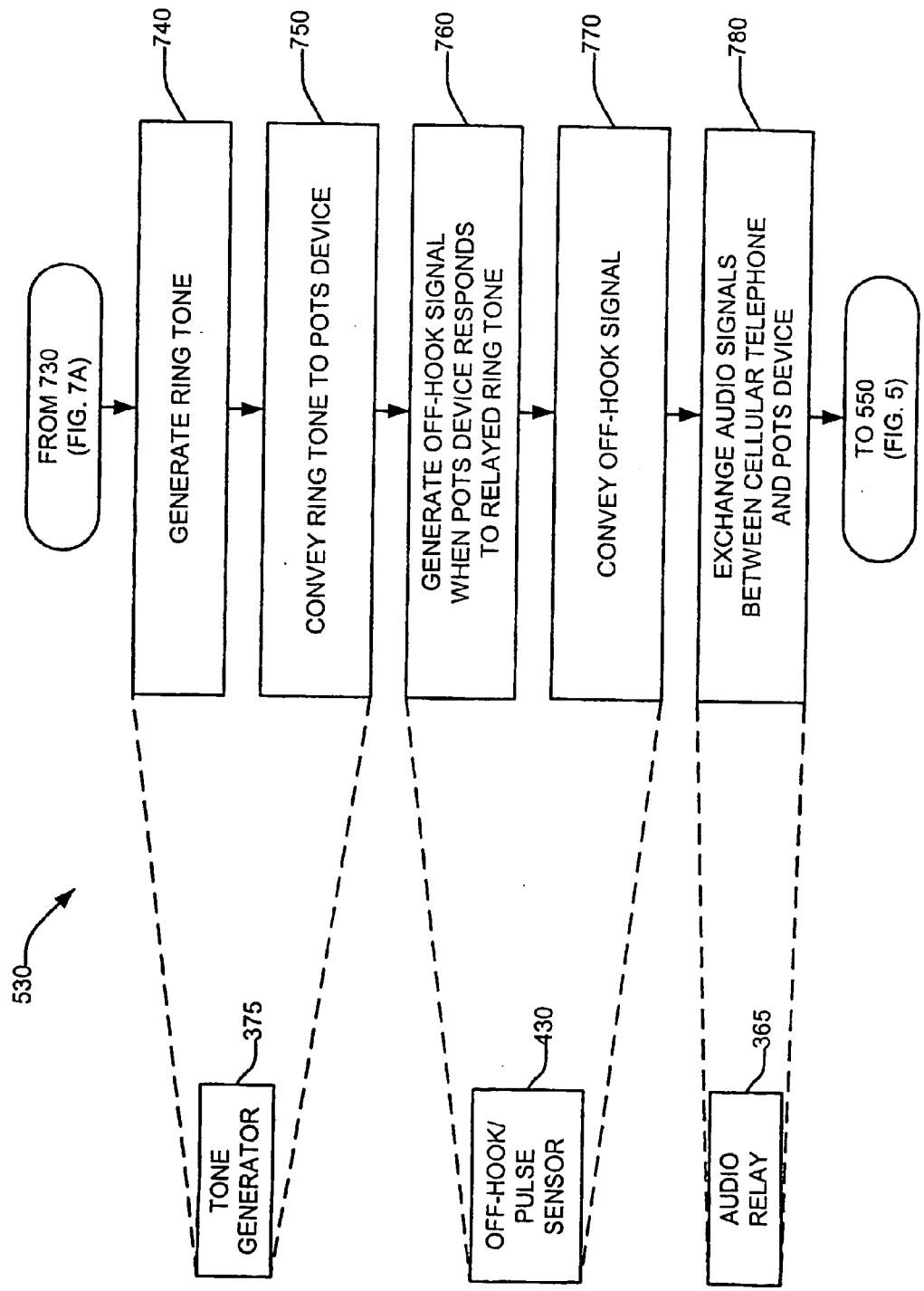

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
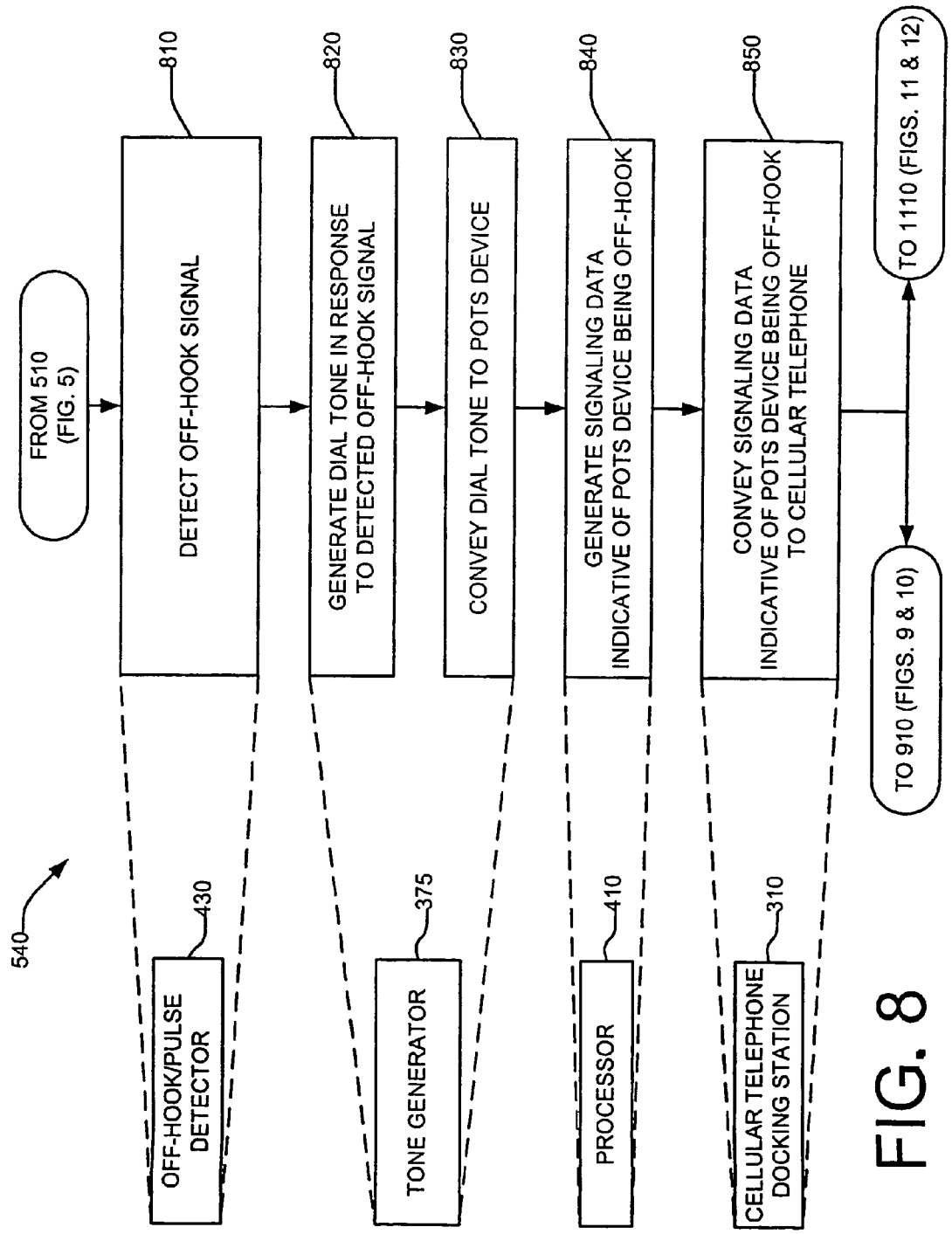
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completely.

Figure 9:
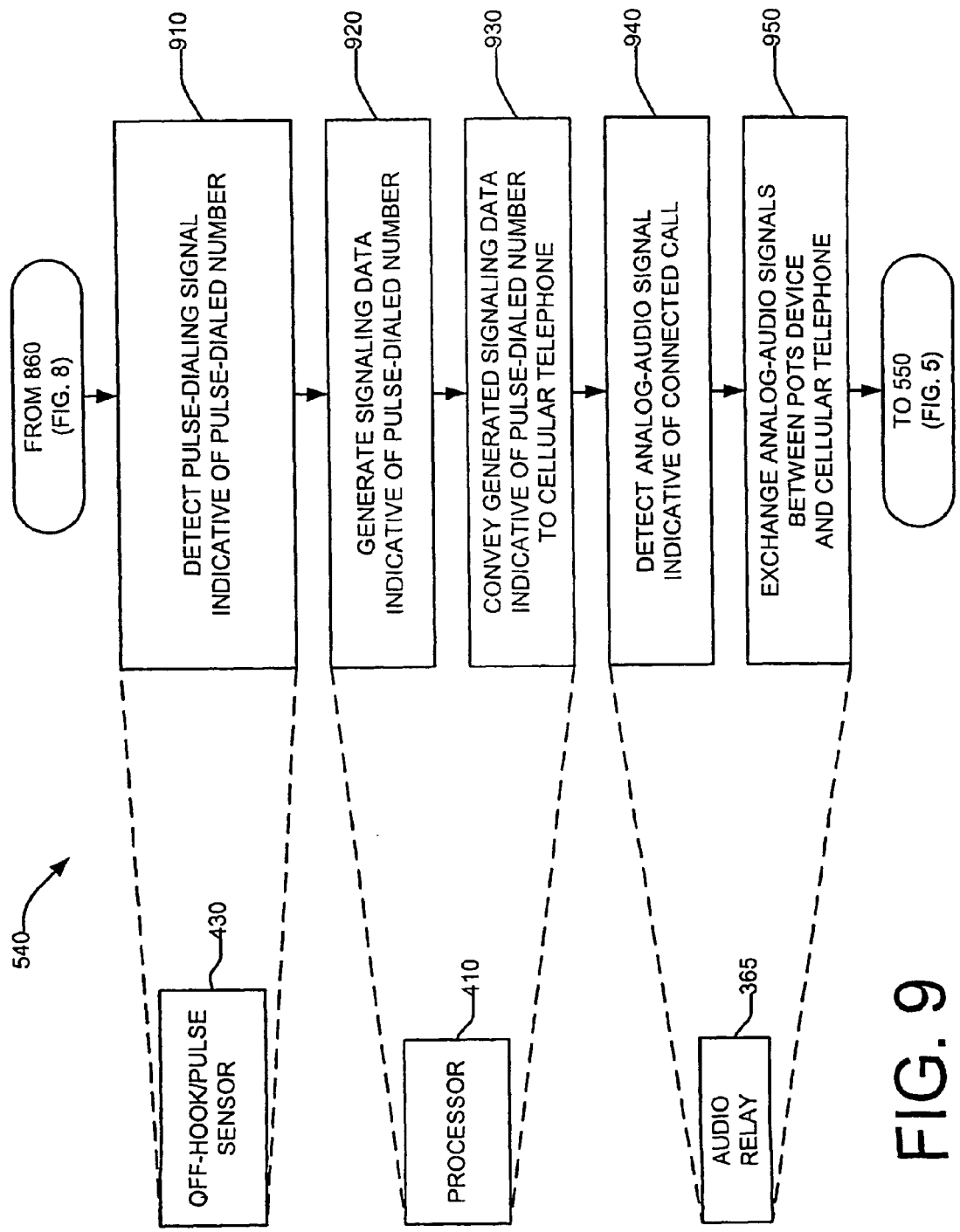
FIGS. 9 through 12 are flowcharts showing several illustrative embodiments of the method associated with the conversion of POTS compatible signals to cellular network compatible signals.
Figure 10:
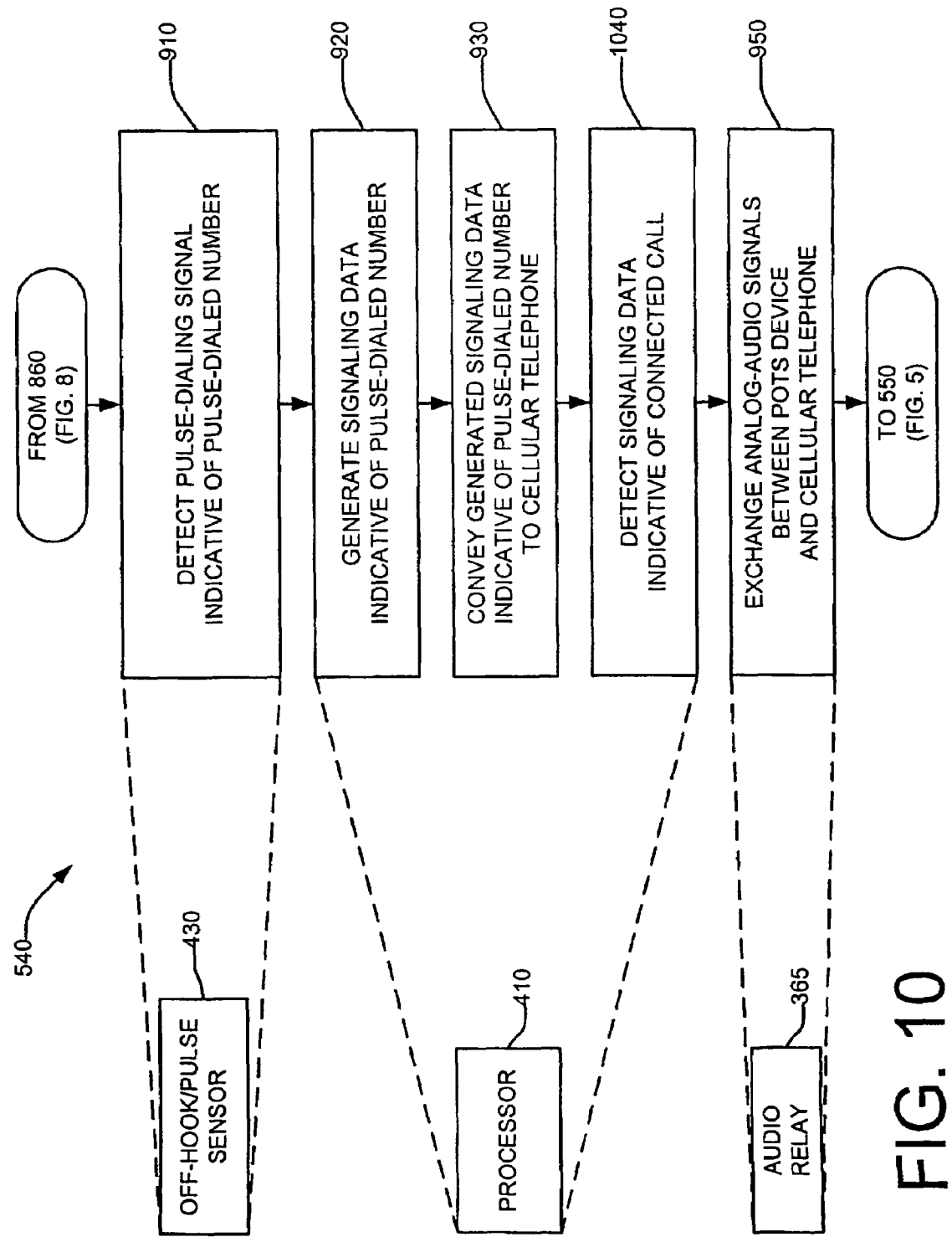

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 (FIG. 3) to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
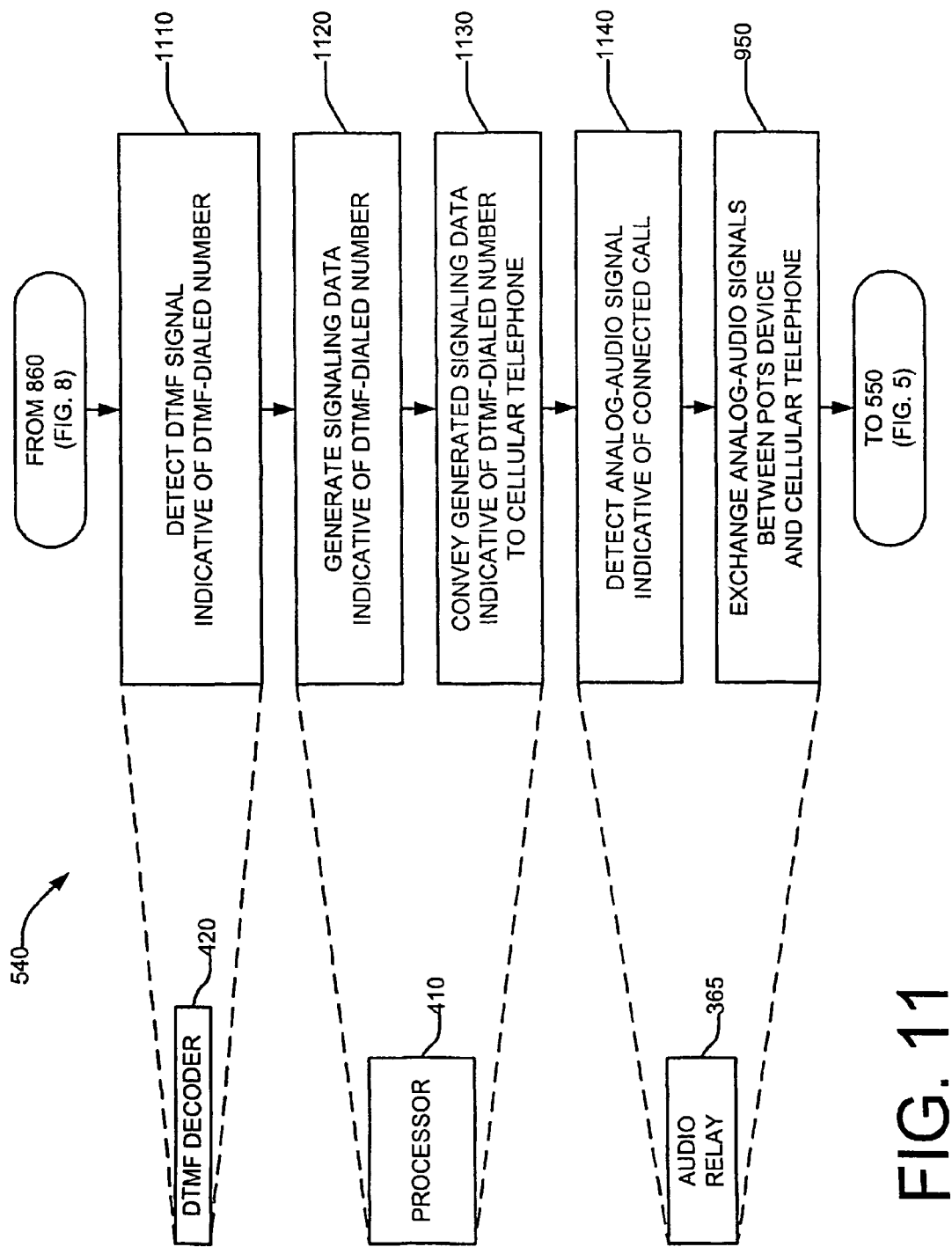
Figure 12:
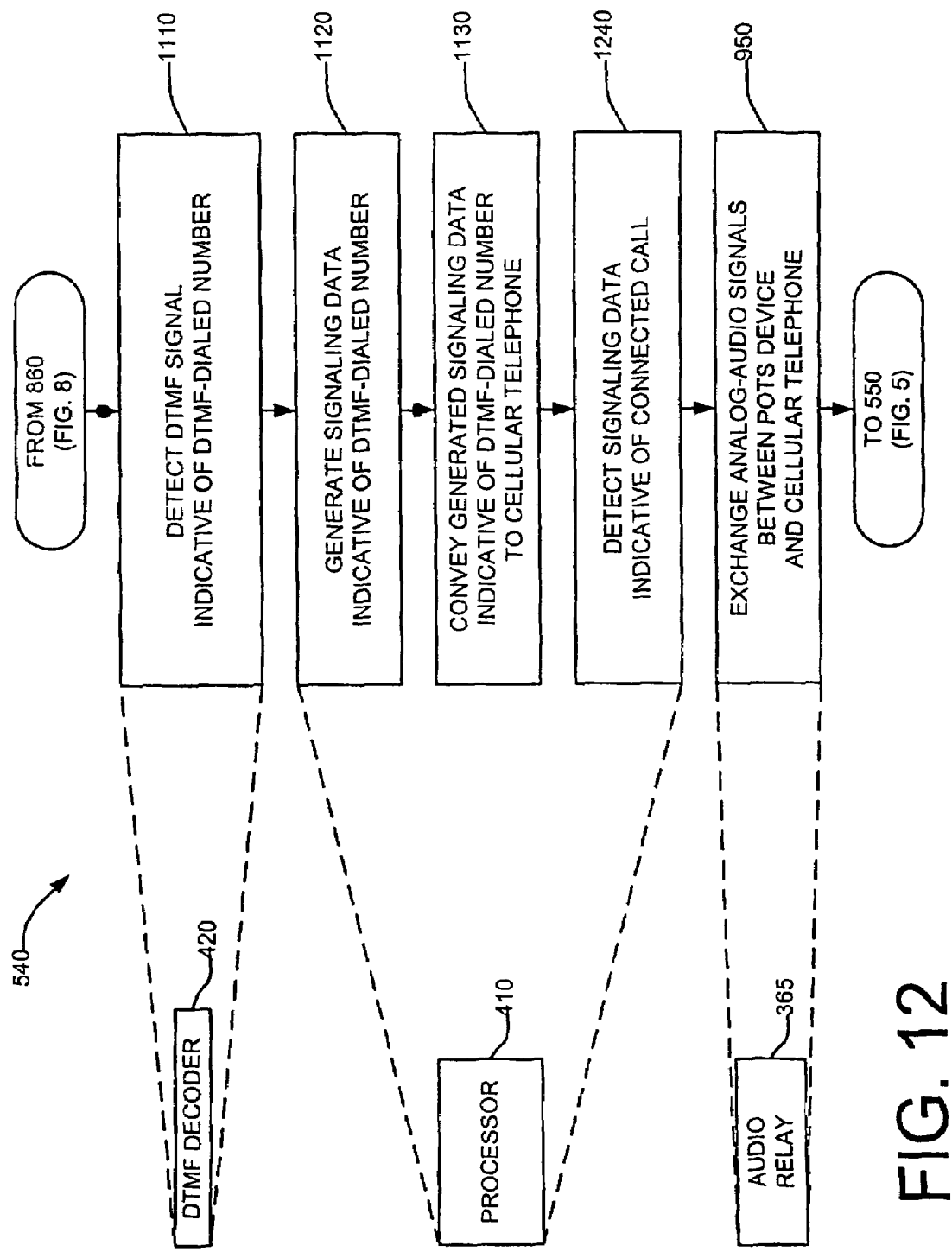

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 13:
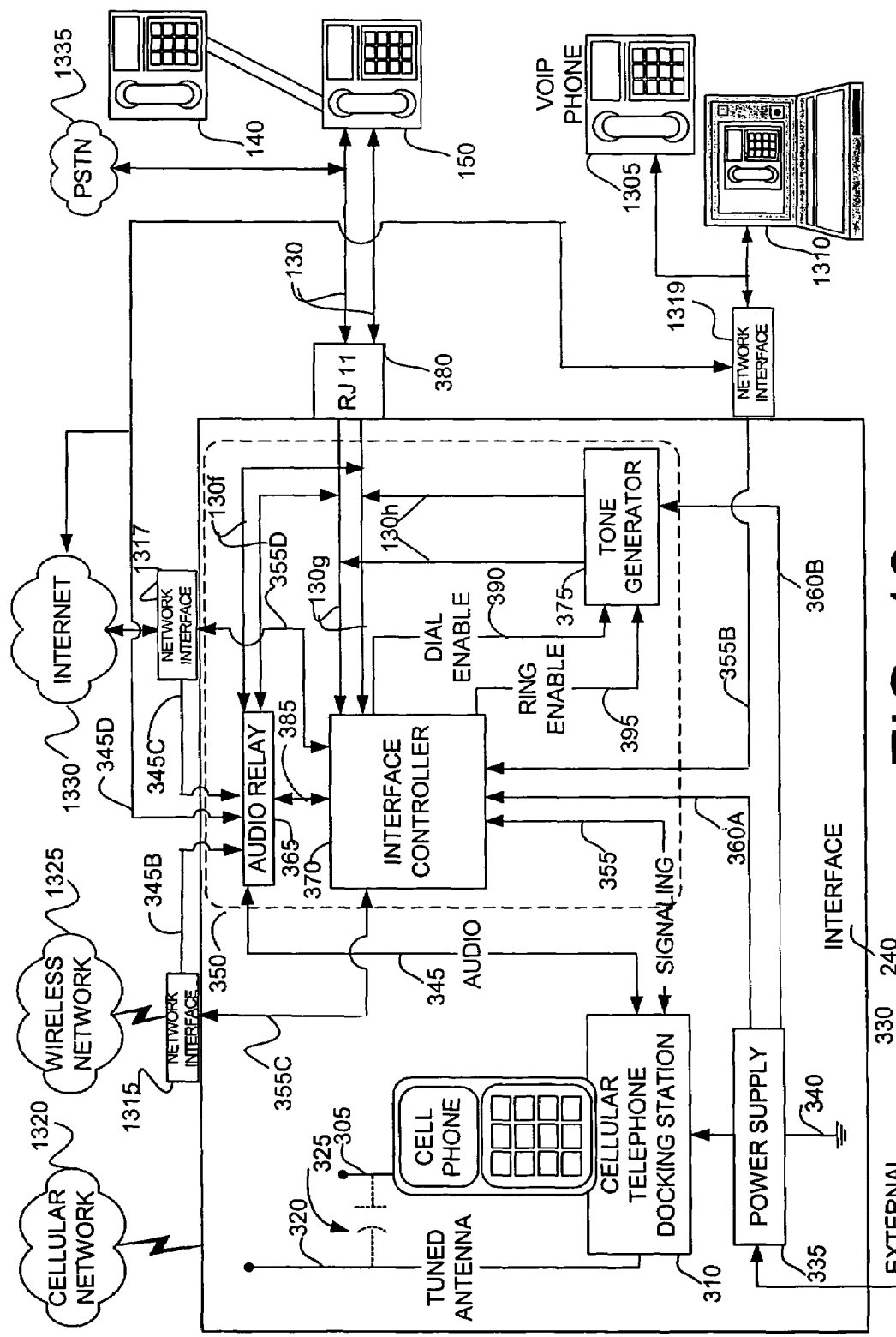
FIG. 13 is a block diagram showing an alternative illustrative embodiment of the interface 240 of FIG. 2.

FIG. 13 is a block diagram showing an alternative illustrative embodiment of the interface 240 of FIG. 3. As described above in the discussion of the illustrative embodiment of FIG. 3, the cellular network compatible signals are transmitted and received at the interface 240 by a cellular telephone 305 while the POTS compatible signals are transmitted and received at the interface 240 through a POTS connector 380, such as an RJ11 connector 380. As in FIG. 3, the interface 240 in this illustrative embodiment comprises a cellular phone docking station 310 that is configured to interface with the cellular telephone 305, an interface controller 370, an audio relay 365, a tone generator 375, and a power supply 335.

In the presently described illustrative embodiment, the interface 240 further includes computer network interfaces 1315, 1317, and 1319. It will be appreciated by those skilled in the art that the network interfaces 1315, 1317, and 1319 may comprise wireline or wireless adapters for communicating with local area networks (LANs) as well as wide area networks such as the Internet. The wireline adapter may conform to the Ethernet LAN standard and may include an Ethernet connector, such as an RJ45 connector (not shown) for enabling communications between a computer and a computer network. The wireless adapter may conform to a variety of wireless LAN standards for communicating with an access point which serves as a hub for connection to a wired local area network (e.g., through a modem). The wireless LAN standards may include, but are not limited to, the 802.11x family of standards (such as 802.11a, 802.11b, and 802.11g) and Bluetooth. It will be appreciated that the wireless adapter may also conform to other wireless standards or protocols such as Ultra Wide Band (UWB).

The network interface 1315 is in communication with the wireless network 1325, the interface controller 370, and the audio relay 365. The network interface 1315 is in communication with the interface controller 370 and the audio relay 365 via signaling lines 355C and 345B, respectively. The network interface 1315 may be utilized to communicate signaling data between the interface controller 370 and the wireless network 1325 over the signaling line 355C and analog-audio signals from the wireless network 1325 to the audio relay 365 over the signaling line 345B. The various signaling communicated over the network interface 1315 will be described in greater detail below in the description of the audio relay 365 and in FIGS. 14-19.

The network interface 1317 is in communication with a wide area network (shown as the Internet 1330), the interface controller 370, and the audio relay 365. The network interface 1317 is in communication with the interface controller 370 and the audio relay 365 via signaling lines 355D and 345C, respectively. The network interface 1315 may be utilized to communicate signaling data between the interface controller 370 and the Internet 1330 over the signaling line 355D and analog-audio signals from the Internet 1330 to the audio relay 365 over the signaling line 345C. The various signaling communicated over the network interface 1317 will be described in greater detail below in the description of the audio relay 365 and in FIGS. 14-19.

The network interface 1319 is in communication with computer telephony devices, shown as a personal computer 1310 and a voice-over-Internet Protocol (VoIP) telephone 1305, the interface controller 370, and the audio relay 365. The network interface 1319 is in communication with the interface controller 370 and the audio relay 365 via signaling lines 355B and 345D, respectively. The network interface 1319 may be utilized to communicate signaling data with the interface controller 370 over the signaling line 355B and analog-audio signals with the audio relay 365 over the signaling line 345D. The various signaling communicated over the network interface 1319 will be described in greater detail below in the description of the audio relay 365 and in FIGS. 14-19.

The cellular phone docking station 310 is configured to receive signaling data through signaling line 355, which may include commands associated with outgoing telephone calls. Thus, in one illustrative embodiment, the signaling data on the signaling line 355 may be indicative of a telephone number. The received signaling data on the signaling line 355 is conveyed to the cellular telephone 305 by the cellular phone docking station 310, thereby permitting control over certain operations of the cellular telephone 305 using the signaling data on the signaling line 355. In conveying the signaling data on the signaling line 355, the cellular phone docking station 305 may modify the signaling data on the signaling line 355 appropriately (e.g., amplify, attenuate, reformat, etc.), or, alternatively, the cellular phone docking station 305 may relay the signaling data on the signaling line 355 without modification. Regardless of whether or not the signaling data on the signaling line 355 is modified, several aspects of the conveyed signal are discussed below, in greater detail, with reference to other components 350 associated with the interface 240.

The audio relay 365 is configured to exchange analog-audio signals 345 between the POTS devices 140, 150 and the cellular phone docking station 310, analog-audio signals 345B between the computer network connector 1315, the cellular phone docking station 310, and the POTS devices 140, 150, analog-audio signals 345C between the computer network connector 1317, the cellular phone docking station 310, and the POTS devices 140, 150, and analog-audio signals 345D between the computer network connector 1319, the cellular phone docking station 310, and the POTS devices 140, 150.

In this sense, for incoming analog-audio signals 345D (i.e., audio from the personal computer 1310 and the VoIP telephone 1305) the audio relay 365 receives the analog-audio signals 345D from the computer network connector 1319 and transmits the analog-audio signals 345D to the POTS devices 140, 150 through the POTS connector 380 or alternatively, to the cellular telephone 305 through the cellular phone docking station 310. Similarly, for outgoing analog-audio signals 345B (i.e., audio from the POTS devices 140, 150 or the cellular telephone 305), the analog audio signals 345 are received by the audio relay 365 though the POTS connector 380 or the cellular docking station 310, and transmitted to the computer network interface 1315. For outgoing analog-audio signals 345C (i.e., audio from the POTS devices 140, 150 or the cellular telephone 305), the analog audio signals 345 are received by the audio relay 365 though the POTS connector 380 or the cellular docking station 310, and transmitted to the computer network interface 1317. Thus, the audio relay 365 provides a bi-directional communication link for the analog-audio signals 345B, 345C, and 345D between the POTS devices 140, 150, the cellular phone docking station 310, and the computer telephony devices 1305 and 1310. In one illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

As discussed above in the description of FIG. 3, the tone generator 375 is configured to generate certain tones that are used by the POTS devices 140, 150. A ring tone is generated in response to a ring enable signal on ring enable line 395. The tone generator 375 is also configured to generate a dial tone and transmit the generated dial tone to the POTS telephones 140, 150. The dial tone is generated in response to a dial enable signal on dial enable line 390.

As discussed above in the description of FIG. 3, the power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of computer telephony compatible signals (i.e., Internet Protocol signals) to POTS compatible signals or cellular network compatible signals, and vice versa. Thus, when an outgoing telephone call is placed by the POTS device 140, the interface controller 370 receives the dialed numbers and converts the dialed numbers to a digital command. The digital command is transmitted as signaling data on signaling line 355D from the interface controller 370 to the computer network interface 1317, which, in turn, transmits the signaling data to a computer telephony device (not shown) connected to the Internet 1330. The signaling data 355D, therefore, dials a telephone number of the computer telephony device connected to the Internet 1330. In one illustrative embodiment, when the number had been dialed and the called party picks up the phone, the network interface 1317 detects the connection and conveys an analog-audio signal 345C to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345C (i.e., talking between the connected parties) through the audio relay 365.

If the party on the POTS telephone 140 disconnects (i.e., hangs up the phone), then the disconnect is detected by the interface controller 370 through the network interface 1317. In this illustrative embodiment, the interface controller 370 generates another audio-control signal 385 in response to the disconnect, thereby disabling the audio relay 365 and terminating the bi-directional audio communication between the POTS telephone 140 and the computer telephony device connected to the Internet 1330. The interface controller 370 further generates, in response to the disconnect, signaling data on signaling line 355D, which instructs the computer telephony device to stop transmission and reception. If, on the other hand, the computer telephony device disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on the signaling line 355D, rather than as an analog-audio signal 345C. In this illustrative embodiment, the computer telephony device generates signaling data on the signaling line 355D through the network interface 1317 when the connection is established. The signaling data on the signaling line 355D is received by the interface controller 370, which generates an audio-control signal 385 in response to the received signaling data on the signaling line 355D. The audio-control signal 385 enables the audio relay 365, thereby permitting bi-directional audio communication between the POTS telephone 140 and the computer telephony device. If the party on the POTS telephone 140 disconnects (i.e., hangs up the phone), then the disconnect is detected by the interface controller 370 through the network interface 1317. The interface controller 370 subsequently generates an audio-control signal 385 to disable the audio relay 365, thereby terminating the bi-directional audio communication between the POTS telephone 140 and the computer telephony device. If, however, the computer telephony device disconnects, then the computer telephony device, in this illustrative embodiment, generates signaling data on the signaling line 355D indicative of the disconnected call. The generated signaling data on signaling line 355D is transmitted to the interface controller 370, which subsequently generates an audio-control signal 385 to disable the audio relay 365.

While hardware components are shown with reference to FIG. 13 to describe the interface controller 370, it will be clear to one of ordinary skill in the art that the interface controller 370 may be implemented in hardware, software, firmware, or a combination thereof. In one illustrative embodiment, the interface controller 370 is implemented in software or firmware that is stored in a memory and that is executed by a suitable instruction execution system. If implemented in hardware, as in FIG. 13, the interface controller 370 may be implemented with any or a combination of the following technologies including, but not limited to, a discrete logic circuit having logic gates for implementing logic functions upon data signals, an application specific integrated circuit (ASIC) having appropriate combinational logic gates, a programmable gate array (PGA), a field programmable gate array (FPGA), other adaptive chip architectures, etc.

It should be understood that in other illustrative embodiments of the invention, the interface controller 370 may also enable bi-directional audio communication between the POTS telephone 140 and the wireless network 1325, the cellular telephone 305 and the Internet 1330, the cellular telephone 305 and the wireless network 1325, the VOIP phone 1305 and the PSTN 1335, and the VOIP phone 1305 and the cellular network 1320. The aforementioned illustrative embodiments will be discussed in greater detail below in the description of FIGS. 14-19.

Figure 14:
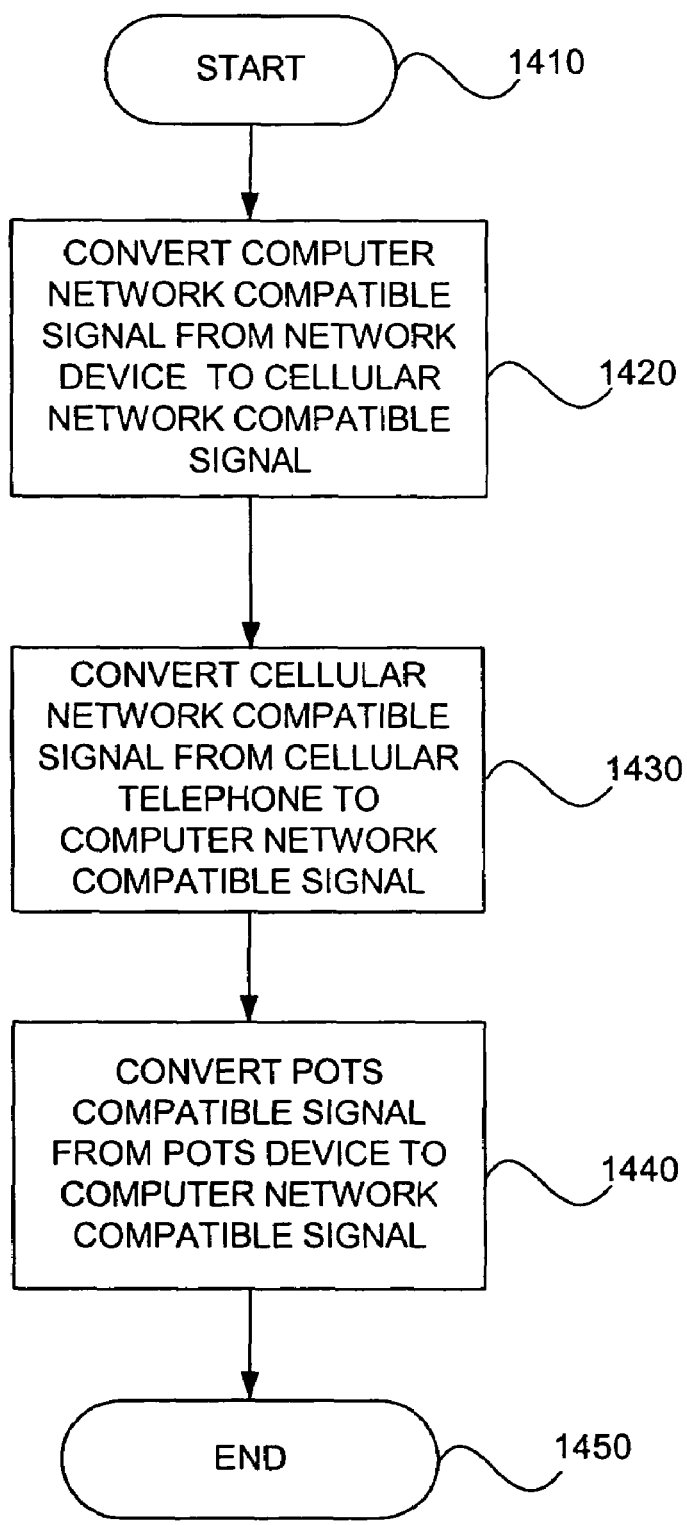
FIGS. 14 through 17 are flowcharts showing several illustrative embodiments of the method associated with the conversion of POTS compatible signals and cellular network compatible signals to computer network compatible signals as well as the conversion of computer network compatible signals to cellular network compatible signals.

FIG. 14 is a flowchart showing an illustrative embodiment of a method for interfacing computer telephony devices with cellular networks and interfacing cellular and POTS devices with computer networks. In a broad sense, once the computer telephony devices 1305 or 1310 (FIG. 13) have been coupled to the cellular telephone 305 through the interface 240, this illustrative embodiment may be seen as converting, in step 1420, computer network (e.g., IP) compatible signals from the computer telephony devices 1305 or 1310 to cellular network compatible signals. Similarly, once the cellular telephone 305 has been coupled to the computer network interfaces 1315 or 1317 through the interface 240, this illustrative embodiment may be seen as converting, in step 1440, cellular network compatible signals from the cellular telephone 305 to computer network compatible signals. Similarly, once the POTS telephones 140, 150 have been coupled to the computer network interfaces 1315 or 1317 through the interface 240, this illustrative embodiment may be seen as converting, in step 1450, PSTN compatible signals from the POTS telephones 140, 150 to computer network compatible signals. Each of the steps 1420-1450 in FIG. 14 will be individually discussed in greater detail below in the description of FIGS. 15-17.

Figure 15:
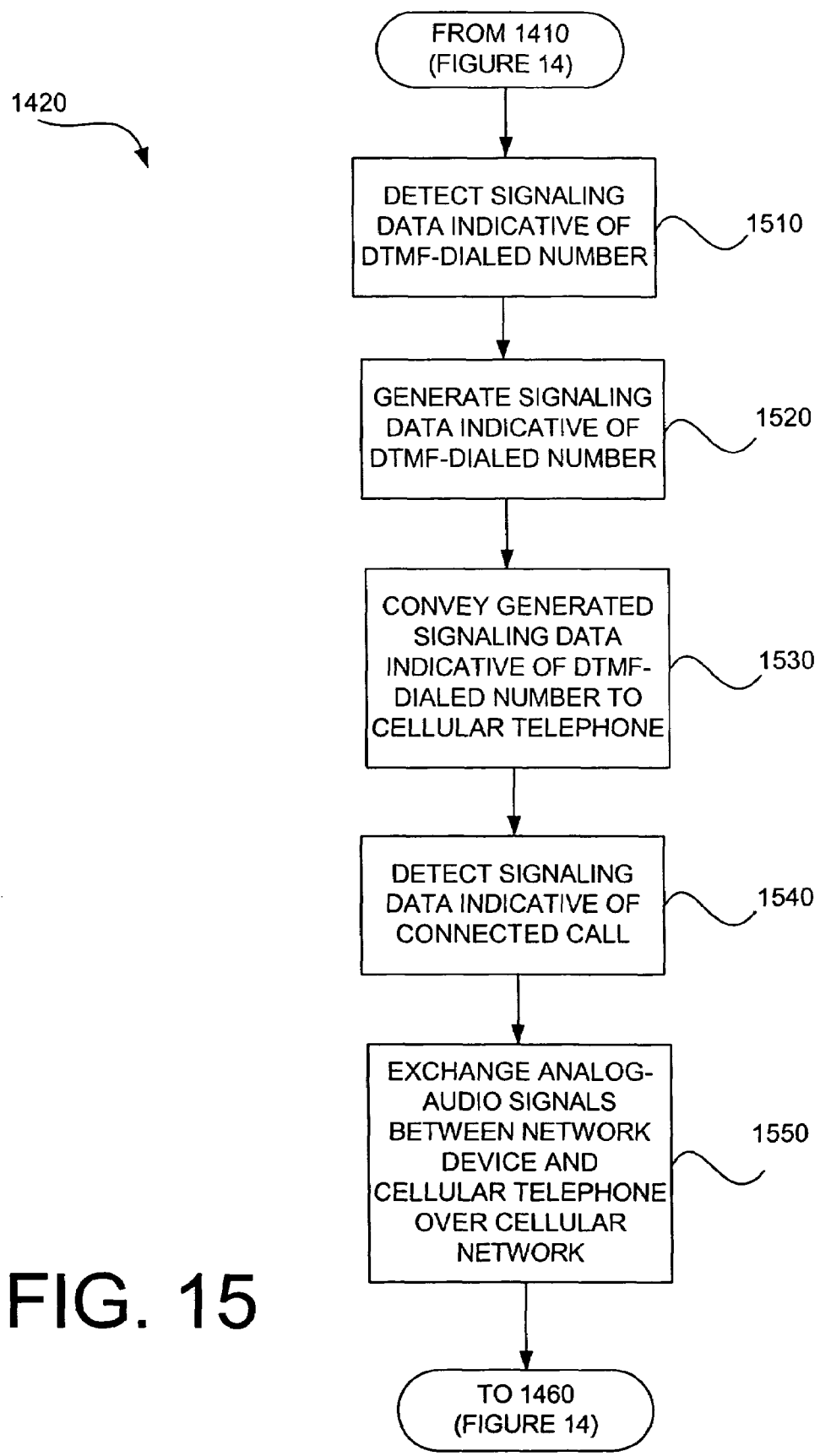

FIG. 15 is a flowchart showing the step 1420 of converting computer network compatible signals to cellular network compatible signals, described above in FIG. 14, in greater detail according to an illustrative embodiment the invention. As shown in FIG. 15, the DTMF decoder 420 (FIG. 4) detects, in step 1510, a DTMF signal that is indicative of a DTMF-dialed number from the computer telephony devices 1305 or 1310 on the signaling line 355B. In response to the DTMF signal, the processor 410 (FIG. 4) generates, in step 1420, signaling data on the signaling line 355 that is indicative of the DTMF-dialed number. The signaling data on the signaling line 355 is conveyed, in step 1530, to the cellular telephone 305, either with or without modification, by the processor 410 (FIG. 4) through the cellular phone docking station 310. This instructs the cellular telephone 305 to call the number that has been conveyed to the cellular telephone 305 by the signaling data on the signaling line 355.

When the called party "picks up" the phone, the cellular telephone 305 generates signaling data on the signaling line 355 that is indicative of the connected call, and the processor 410 (FIG. 4) detects, in step 1540, the signaling data on signaling line 355. At this point, the processor 410 (FIG. 4) enables the audio relay 365, and analog-audio signals 345 are exchanged, in step 1550, between the computer telephony devices 1305 or 1310 and the cellular telephone 305. Thus, the computer telephony devices 1305 or 1310 may freely communicate through the cellular network.

Figure 16:
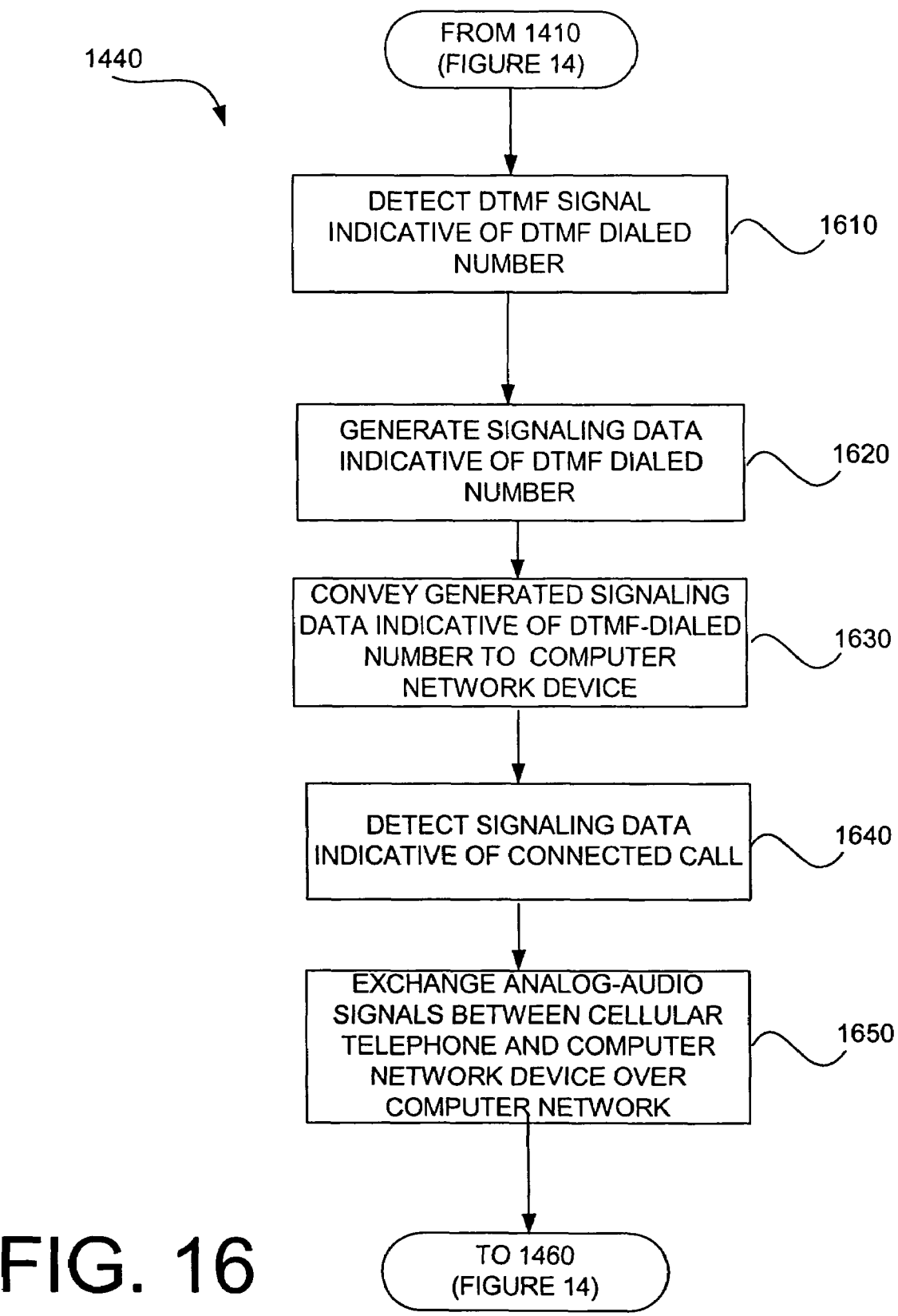

FIG. 16 is a flowchart showing the step 1430 of converting cellular network compatible signals to computer network compatible signals, described above in FIG. 14, in greater detail according to an illustrative embodiment the invention. As shown in FIG. 16, the DTMF decoder 420 (FIG. 4) detects, in step 1610, a DTMF signal that is indicative of a DTMF-dialed number from the cellular telephone 305 through the cellular telephone docking station 310 on the signaling line 355. In response to the DTMF signal, the processor 410 (FIG. 4) generates, in step 1620, signaling data on the signaling line 355D that is indicative of the DTMF-dialed number. The signaling data on the signaling line 355D may be conveyed, in step 1630, to a computer telephony device (not shown) in communication with the Internet 1330, either with or without modification, by the processor 410 (FIG. 4) through the network interface 1317. Thus the interface controller 370 calls the number that has been conveyed to the processor 410 (FIG. 4) by the signaling data on the signaling line 355D.

When the called party "picks up" the phone, the computer telephony device in communication with the Internet 1330 generates signaling data on the signaling line 355D through the network interface 1317 that is indicative of the connected call, and the processor 410 (FIG. 4) detects, in step 1640, the signaling data on signaling line 355D. At this point, the processor 410 (FIG. 4) enables the audio relay 365, and analog-audio signals 345C are exchanged, in step 1650, between the computer telephony device and the cellular telephone 305. Thus, the cellular telephone 305 may freely communicate over the Internet 1330.

It will be appreciated that in an alternative illustrative embodiment, the interface controller 370 may also be configured to enable the cellular telephone 305 to communicate with the wireless network 1325 over the network interface 1315. In this embodiment, the processor 410 (FIG. 4) may be programmed to convey and receive signaling data on the signaling line 355C to a wireless device (e.g., a Bluetooth handset) in communication with the wireless network 1325. The processor 410 (FIG. 4) may also be programmed to enable the audio relay 365 so that analog-audio signals 355C are exchanged such that the cellular telephone 305 may freely communicate over the wireless network 1325. It should be appreciated that the wireless network 1325 may conform to a variety of wireless communications standards such as the 802.11, UWB, and Bluetooth standards which are known to those skilled in the art.

Figure 17:
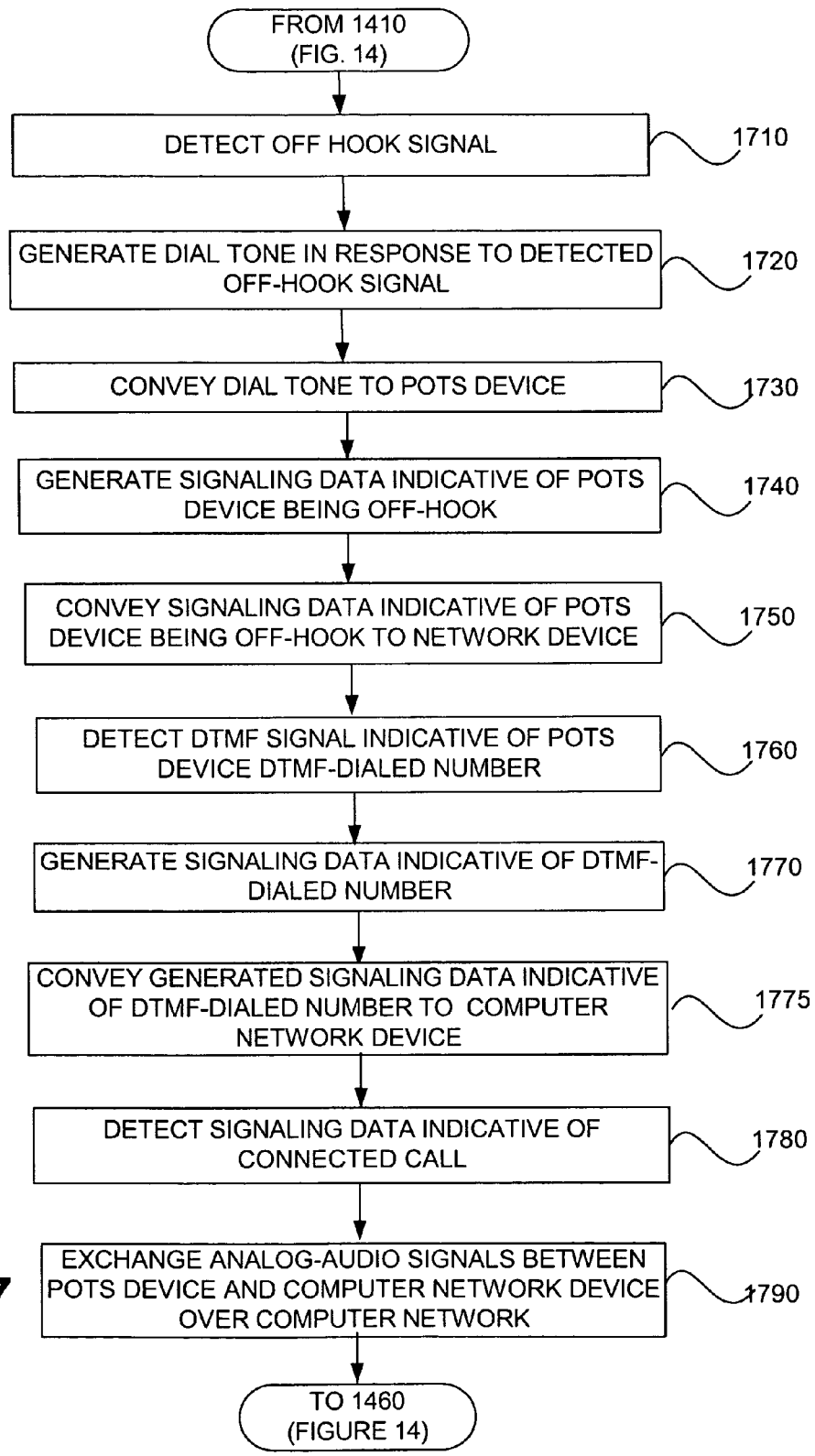

FIG. 17 is a flowchart showing the step 1440 of converting POTS network compatible signals to computer network compatible signals, described above in FIG. 14, in greater detail according to an illustrative embodiment the invention. As shown in FIG. 17, after a user "picks up" the phone 140 to place an outgoing call, the system detects, in step 1710, an off-hook signal at the off-hook/pulse detector 430 (FIG. 4). The system then generates, in step 1720, a dial tone in response to the detected off-hook signal. In an illustrative embodiment, the dial tone may be generated by the tone generator 375. The generated dial tone is conveyed, in step 1730, to the POTS device 140, 150 (FIG. 2) (i.e., to the person that is placing the outgoing call) to indicate that the system is ready for dialing. In addition to generating the dial tone, the system further generates, in step 1740, signaling data on the signaling line 355D that is indicative of the POTS device 140 being off-hook. The generated signaling data on the signaling line 355D is then conveyed, in step 1750, to a computer telephony device (not shown) in communication with the Internet 1330, either with or without modification, through the computer network interface 1317, thereby indicating to the computer telephony device that a user has "picked up" the phone 140, and that an outgoing call may be initiated. The DTMF decoder 420 (FIG. 4) then detects, in step 1760, a DTMF signal that is indicative of a DTMF-dialed number from the POTS device 140. In response to the DTMF signal, the processor 410 (FIG. 4) generates, in step 1770, signaling data on the signaling line 355D that is indicative of the DTMF-dialed number. The signaling data on the signaling line 355D may be conveyed, in step 1775, to the computer telephony device in communication with the Internet 1330, either with or without modification, by the processor 410 (FIG. 4) through the network interface 1317. Thus the interface controller 370 calls the number that has been conveyed to the processor 410 (FIG. 4) by the signaling data on the signaling line 355D.

When the called party "picks up" the phone, the computer telephony device in communication with the Internet 1330 generates signaling data on the signaling line 355D through the network interface 1317 that is indicative of the connected call, and the processor 410 (FIG. 4) detects, in step 1780, the signaling data on signaling line 355D. At this point, the processor 410 (FIG. 4) enables the audio relay 365, and analog-audio signals 345C are exchanged, in step 1790, between the computer telephony device and the POTS device 140. Thus, the POTS device 140 may freely communicate over the Internet 1330. It will be appreciated that in an alternative illustrative embodiment, the interface controller 370 may also be configured to enable the POTS device 140 to communicate with the wireless network 1325 over the network interface 1315 in a manner similar to that as described above with respect to FIG. 16.

Figure 18:
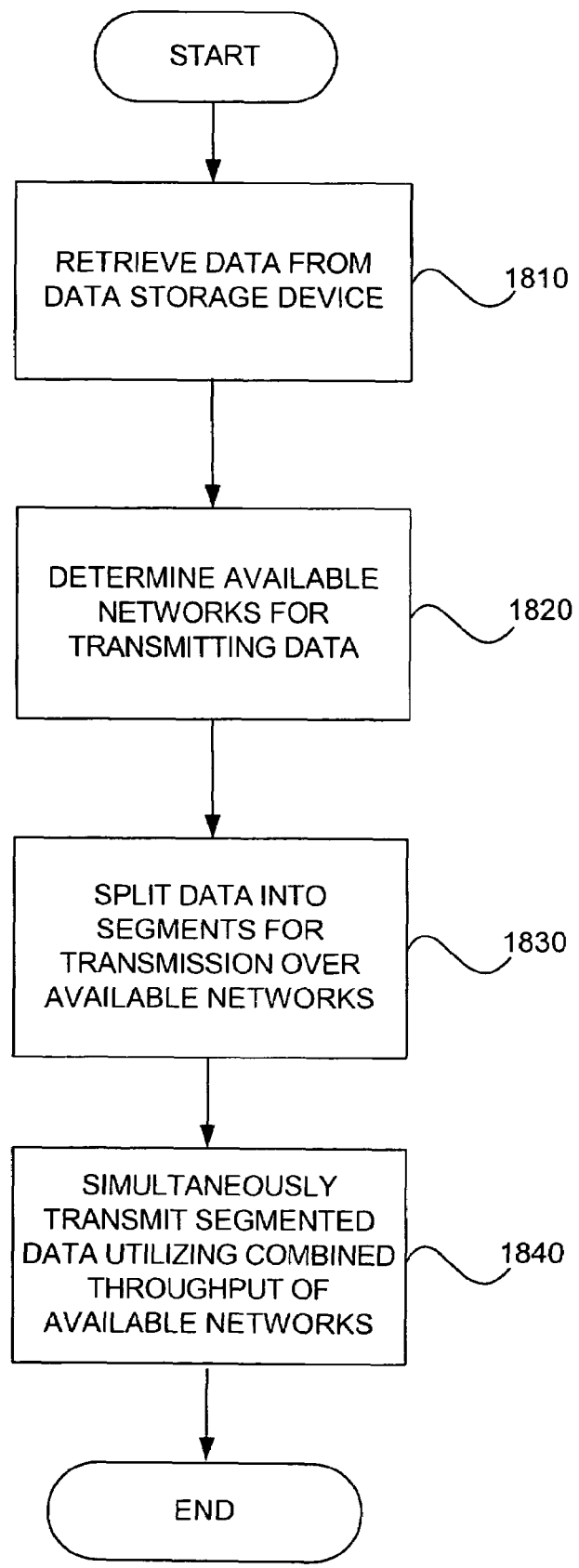
FIG. 18 is a flowchart showing an illustrative embodiment of the method associated with aggregating network connectivity for simultaneously communicating data over multiple networks.

FIG. 18 is a flowchart showing an illustrative embodiment of a method of aggregating the connections for communicating over the cellular network 1320 and the Internet 1330. In this illustrative embodiment, the interface controller 370 may be configured to retrieve a data file, in step 1810, from a connected computer, such as the computer telephony device 1310, via the network interface 1319 over the signaling line 355B. For instance, the data file may comprise a large video file containing a collection digital photographs which a user of the computer telephony device 1310 may desire to send to another computer in communication with the Internet 1330 and the cellular network 1320. Once the data file is received, it may be stored in the RAM 460 (FIG. 4) of the interface controller 370. After the data file has been stored in the interface controller 370, the processor 410 (FIG. 4) determines, in step 1820, available networks for transmitting the data file. In particular, the processor 410 (FIG. 4) may be configured to detect the presence of signaling data on the signaling lines 355C and 355D and whether analog-audio signals 345 and 345C are being exchanged with the cellular network 1320 and the Internet 1330. If no signaling is present, then the aforementioned networks are available for transmitting data.

After the processor 410 (FIG. 4) determines available networks for transmitting the data file, the interface controller 370, in step 1830, splits the stored data file into segments and, at step 1840, simultaneously transmits each data file segment via signaling lines 355 and 355D to the cellular phone docking station 310 and the network interface 1317 for transmission over the cellular network 1320 and the Internet 1330. It will be appreciated by those skilled in the art that the interface controller 370 may be configured to execute a computer program, which may be stored in the ROM 440 (FIG. 4), for implementing an algorithm for the segmentation, dispersion, and assemblage of electronic data among multiple networks. It will further be appreciated that the computer program may also be configured to utilize the network interfaces to communicate with multiple network providers to dynamically negotiate or "barter" for the cheapest transport of the segmented data. For instance, if it is cheaper to use a cellular network during nighttime versus daytime, the program may wait to transmit stored data during nighttime hours. It will be appreciated that by aggregating the connectivity of the cellular phone docking station 310 and the network interface 1317 to achieve higher throughput for transmitting data.

Various illustrative methods detailing the segmentation, dispersion, and assemblage of electronic data among multiple networks are presented in co-pending U.S. patent application Ser. No. 10/720,956, entitled "Methods for Providing Communications Services," filed on Nov. 24, 2003, Ser. No. 10/720,946, entitled "Methods for Providing Communications Services," filed on Nov. 24, 2003, Ser. No. 10/720,587, entitled "Methods for Providing Communications Services," filed on Nov. 24, 2003, and Ser. No. 10/720,892, entitled "Methods for Providing Communications Services," filed on Nov. 24, 2003. All of the aforementioned applications are assigned to the same assignee as this application, and are expressly incorporated herein, in their entirety, by reference.

While illustrative embodiments of the present invention have been shown and described, it will be apparent to those of ordinary skill in the art that a number of changes, modifications, or alterations to the invention as described may be made, none of which depart from the spirit of the present invention. For example, while a cellular telephone 305 (FIG. 13) is used as the bridge between the POTS devices 140, 150 and the cellular network, it will be clear to one of ordinary skill in the art that any cellular device may be used as the bridge, such as a cellular compatible personal digital assistant (PDA), cellular modem, or any other cellular device that is configured to transmit and receive data from a cellular network. Furthermore, while the flowcharts of FIGS. 14 through 18 show several illustrative embodiments of the method as being performed in sequential order, it will be clear to one of ordinary skill in the art that several of the method steps may be taken out of order without adverse effect to the invention. For example, the step of generating signaling data indicative of POTS devices being off-hook may be completely removed without detriment to the invention. These and other such changes, modifications, and alterations should therefore be seen as within the scope of the present invention.

We claim:

1. A system for interfacing a telephony device with a plurality of communications networks, comprising:
   an interface configured to convert a first network signal compatible with a first communications network to a second network signal compatible with a second communications network, wherein the interface is further configured to convert the second network signal to the first network signal;
   at least one device connector configured to couple the telephony device to the interface; and
   an interface controller configured to interface with the at least one device connector and send audio-control signals to the audio relay,
   wherein the telephony device comprises at least one of a plain old telephone system (POTS) device, a cellular device, and a computer network device, wherein the interface includes an audio relay configured to receive a first audio-control signal and transmit an analog-audio signal between the telephony device and a network device interface configured to translate the analog-audio signal to a protocol compatible with the second communications network, in response to the received first audio-control signal, wherein the telephony device is compatible with the first communications network, wherein the analog-audio signal is indicative of the network device being in use, wherein the system is configured to allow the telephony device to communicate with each of a PSTN, a computer network using a VoIP signal, and a cellular network, wherein when the telephony device disconnects the disconnect is detected by the interface controller through the network device interface and generates a second audio-control signal which disables the audio relay and terminates the connection between the telephony device and the network device, and wherein during a communication with the computer network a disconnect causes the interface controller to further generate signaling data which instructs a computer telephony device to stop transmission and reception.

2. The system of claim 1, wherein the at least one device connector is a POTS connector.

3. The system of claim 1, wherein the at least one device connector is an Ethernet connector.

4. The system of claim 1, wherein the at least one device connector is a wireless connector.

5. The system of claim 1, wherein the interface comprises a docking station configured to interface with the cellular device.

6. The system of claim 5, wherein the docking station is further configured to convey signaling data to the cellular device.

7. The system of claim 6, wherein the signaling data is indicative of a telephone number.

8. The system of claim 5, wherein the docking station is further configured to convey signaling data from the cellular device.

9. The system of claim 6, wherein the signaling data is indicative of an incoming telephone call.

10. The system of claim 1, wherein the first communications network comprises at least one of a cellular network and a POTS network.

11. The system of claim 1, wherein the second communications network comprises a computer network.

12. The system of claim 11, wherein the computer network comprises a wide area network.

13. The system of claim 11, wherein the computer network comprises a local area network.

14. The system of claim 1, wherein the interface comprises a DTMF decoder, wherein the DTMF decoder is operative to detect signaling data from the at least one of a POTS device, a cellular device, and a computer network device.

15. The system of claim 14, wherein the interface further comprises a processor in communication with the DTMF decoder, wherein the processor is operative to:
generate signaling data in response to the signaling data detected by the DTMF decoder, wherein the signaling data is indicative of a telephone number;
convey the generated signaling data to the at least one of a POTS device, a cellular device, and a computer network device; and
detect a signal indicative of a connection made with the at least one of a POTS device, a cellular device, and a computer network device.

16. The system of claim 15, wherein the interface further comprises an audio relay in communication with the processor, wherein the audio relay is operative to exchange analog-audio signals between the at least one of a POTS device, a cellular device, and a computer network device over the second communications network.

17. The system of claim 15, wherein the interface controller further comprises an off-hook/pulse sensor configured to detect when the POTS device is off-hook and generate an off-hook signal in response to detecting when the POTS device is off-hook, wherein the processor is configured to receive the off-hook signal from the off-hook/pulse detector and generate signaling data in response to the received off-hook signal, wherein the signaling data is indicative of the POTS device being off-hook.

18. A method for interfacing a plain old telephone system (POTS) device, cellular network device, and a computer network device with a plurality of communications networks, comprising:
converting a first network signal compatible with a first communications network to a second network signal compatible with a second communications network at an interface; and
converting the second network signal to the first network signal at the interface, wherein the interface is coupled to at least one of the POTS device, the cellular network device, and the computer network device, wherein the interface includes an audio relay configured to receive a first audio-control signal and transmit an analog-audio signal between the at least one of the POTS device, the cellular network device, and the computer network device, and a network device interface configured to translate the analog-audio signal to a protocol compatible with the second communications network, in response to the received first audio-control signal, wherein the at least one of the POTS device, the cellular network device, and the computer network device is compatible with the first communications network, wherein the analog-audio signal is indicative of the network device being in use, wherein an interface controller sends the audio-control signal to the audio relay, wherein the interface is configured to allow the at least one of the POTS device, the cellular network device, and the computer network device to communicate with each of a PSTN, a computer network using a VoIP signal, and a cellular network, wherein when the at least one of the POTS device, the cellular network device, and the computer network device disconnects the disconnect is detected by the interface controller through the network device interface and generates a second audio-control signal which disables the audio relay and terminates the connection between the at least one of the POTS device, the cellular network device, and the computer network device and the network device, and wherein during a communication with the computer network a disconnect causes the interface controller to further generate signaling data which instructs a computer telephony device to stop transmission and reception.

19. The method of claim 18, wherein converting a first network signal compatible with a first communications network to a second network signal compatible with a second communication network at an interface comprises:
detecting first signaling data from the at least one of a POTS device, a cellular device, and a computer network device;
generating second signaling data in response to the detected first signaling data, wherein the second signaling data is indicative of a telephone number;
conveying the second signaling data to the at least one of a POTS device, a cellular device, and a computer network device;
detecting a signal indicative of a connection made with the at least one of a POTS device, a cellular device, and a computer network device; and
enabling communication between the at least one of a POTS device, a cellular device, and a computer network device over the second communications network.

20. The method of claim 19, wherein the first signaling data is a DTMF-dialing signal.

21. The method of claim 19, wherein the signal indicative of a connection made with the at least one of a POTS device, a cellular device, and a computer network device is an analog-audio signal indicative of a connected call.

22. The method of claim 19, wherein enabling communication between the at least one of a POTS device, a cellular device, and a computer network device over the second communications network comprises exchanging analog-audio signals over the second communications network.

23. The method of claim 18, wherein converting a first network signal compatible with a first communications network to a second network signal compatible with a second communication network at an interface comprises further comprises:
detecting an off-hook signal;
generating a dial tone in response to detecting the off-hook signal; and
conveying the dial tone;
generating signaling data indicative of an off-hook condition; and
conveying the signaling data indicative of the off-hook condition over the second communications network.

24. A computer-readable medium having computer-executable instructions stored thereon which, when executed by a computer, will cause the computer to perform a method for interfacing a plain old telephone system (POTS) device, cellular network device, and a computer network device with a plurality of communications networks, the method comprising:
converting a first network signal compatible with a first communications network to a second network signal compatible with a second communications network at an interface; and
converting the second network signal to the first network signal at the interface, wherein the interface is coupled to at least one of the POTS device, the cellular network device, and the computer network device, wherein the interface includes an audio relay configured to receive a first audio-control signal and transmit an analog-audio signal between the at least one of the POTS device, the cellular network device, and the computer network device, and a network device interface configured to translate the analog-audio signal to a protocol compatible with the second communications network, in response to the received first audio-control signal, wherein the at least one of the POTS device, the cellular network device, and the computer network device is compatible with the first communications network, wherein the analog-audio signal is indicative of the network device being in use, wherein an interface controller sends the audio-control signal to the audio relay, wherein the interface is configured to allow the at least one of the POTS device, the cellular network device, and the computer network device to communicate with each of a PSTN, a computer network using a VoIP signal, and a cellular network, wherein when the at least one of the POTS device, the cellular network device, and the computer network device disconnects the disconnect is detected by the interface controller through the network device interface and generates a second audio-control signal which disables the audio relay and terminates the connection between the at least one of the POTS device, the cellular network device, and the computer network device and the network device, and wherein during a communication with the computer network a disconnect causes the interface controller to further generate signaling data which instructs a computer telephony device to stop transmission and reception.

* * * * *